United States Patent [19]
Kato et al.

[11] Patent Number: 6,151,360
[45] Date of Patent: *Nov. 21, 2000

[54] METHOD FOR ENCODING VIDEO SIGNAL USING STATISTICAL INFORMATION

[75] Inventors: Motoki Kato; Takashi Kojima, both of Kanagawa; Tsuyoshi Oda, Chiba, all of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/962,222

[22] Filed: Oct. 31, 1997

Related U.S. Application Data

[63] Continuation of application No. 08/637,527, Apr. 25, 1996, abandoned.

[30] Foreign Application Priority Data

| Apr. 28, 1995 | [JP] | Japan | 7-106403 |
| Nov. 29, 1995 | [JP] | Japan | 7-311436 |
| Nov. 30, 1995 | [JP] | Japan | 7-313348 |

[51] Int. Cl.$^7$ .................................................. H04N 7/12
[52] U.S. Cl. ................................ 375/240.03; 375/240.23
[58] Field of Search .................................. 348/405, 384, 348/390, 400, 401, 402, 391, 396, 404, 409–412, 420, 415, 421; 386/1, 27, 33; 375/240.03, 240.23; H04N 7/12

[56] References Cited

U.S. PATENT DOCUMENTS

| 4,141,034 | 2/1979 | Netravali et al. | 348/396 |
| 4,984,076 | 1/1991 | Watanabe et al. | 348/405 |
| 5,038,209 | 8/1991 | Hang | 348/405 |
| 5,049,990 | 9/1991 | Kondo et al. | 348/421 |
| 5,307,163 | 4/1994 | Hatano et al. | 348/415 |
| 5,333,012 | 7/1994 | Singhai et al. | 348/405 |
| 5,396,567 | 3/1995 | Jass | 348/405 |
| 5,426,463 | 6/1995 | Reininger et al. | 348/405 |
| 5,544,263 | 8/1996 | Iwamura | 348/402 |
| 5,559,557 | 9/1996 | Kato | 348/405 |
| 5,598,213 | 1/1997 | Chung et al. | 348/405 |

*Primary Examiner*—Young Lee
*Attorney, Agent, or Firm*—Frommer Lawrence & Haug, LLP.; William S. Frommer

[57] ABSTRACT

A picture encoding method employed in a system for encoding video signals of a motion picture for storage on a picture recording medium or in a system employed for transmitting video signals of a moving picture over a transmission channel. The encoding method includes a first step of generating the information on picture characteristics at least including the luminance information of the input video signals in terms of a pre-set time interval as a unit, a second step of calculating the information on the amount of generated bits of the information on picture characteristics in terms of a pre-set time interval as a unit, a third step of determining an encoding bit rate, based upon the information on picture characteristics, the information on the amount of the generated bits and the information on the total amount of data usable during transmission of encoded data, in terms of the pre-set time interval as a unit, and a fourth step of encoding the input video signals in accordance with the encoding bit rate in terms of the pre-set time as a unit for generating the encoded data.

8 Claims, 17 Drawing Sheets

METHOD FOR ENCODING VIDEO SIGNAL USING STATISTICAL INFORMATION

This application is a continuation of application Ser. No. 08/637,527, filed Apr. 25, 1996 abandoned.

BACKGROUND OF THE INVENTION

This invention relates to a picture encoding method, a picture encoding apparatus and a picture recording medium. More particularly, it relates to a picture encoding method and apparatus and a picture recording medium employed in a system for encoding video signals of a motion picture for storage on a picture recording medium, such as an optical disc, a magnetic disc or a magnetic tape, or in a system employed for transmitting video signals of a moving picture over a transmission channel.

FIG. 1 shows an encoder in which data is compressed as intra-frame coding exploiting line correlation is switched to inter-frame coding exploiting inter-frame correlation or vice versa for improving the transmission efficiency. With the present encoder, prediction of motion compensation is executed on, for example, the macro-block basis for further improving the efficiency.

FIG. 2 shows a decoder as a counterpart device of the encoder of FIG. 1. By employing this decoder, data encoded by high efficiency encoding can be reproduced appropriately.

With the above encoder, the encoding bit rate of a bitstream generated in an encoder 75 is constant for meeting with the transfer rate of a transmission medium 90. The amount of generated data, that is the quantization step size of a quantizer 106, is controlled under these restrictions. Stated differently, if plural pictures with complex patterns occur contiguously, the quantization step size is increased for suppressing the amount of generated data, whereas, if plural picture of simple patterns occur contiguously, the quantization step size is decreased for increasing the amount of generated data for prohibiting overflow or undeflow of the buffer memory 109 from occurring for maintaining a fixed rate.

If, with the above encoder, complex pictures occur contiguously, the quantization step size is increased, thus deteriorating the picture quality, whereas, if simple pictures occur contiguously, the quantized step size is decreased, thus allowing to produce pictures of uniform picture quality on the whole.

On the other hand, for recording a bitstream on a picture recording medium having a limited data capacity, a high fixed rate which will not impair the picture quality has to be applied comprehensively for avoiding deterioration of the complex picture quality, thus decreasing the recording time.

There are also occasions wherein, even if the degree of picture complexity is the same, the encoded picture gives a poor subjective impression as to the picture quality depending upon the picture patterns owing to characteristics of the visual sense of the human being. For example, the encoding noise, such as block noise or mosquito noise, become apparent in dark portions, red portions or flat portions of a picture.

SUMMARY OF THE INVENTION

It is therefore an object of the present invention to provide a picture encoding method, a picture encoding apparatus and a picture recording medium in which the picture quality uniform and satisfactory on the whole and longtime recording is achieved and in which encoding may be made so that the encoding noise is rendered less obtrusive in view of the visual sense of the human being.

According to the present invention, there is provided a method for encoding picture signals including a first step of generating the information on picture characteristics at least including the luminance information of the input video signals, with a pre-set time interval as a unit, a second step of calculating the information on the amount of generated bits of the information on picture characteristics, with a pre-set time interval as a unit, a third step of determining an encoding bit rate, based upon the information on picture characteristics, the information on the amount of the generated bits and the information on the total amount of data usable during transmission of encoded data, with the pre-set time interval as a unit, and a fourth step of encoding the input video signals in accordance with the encoding bit rate, with the pre-set time as a unit, for generating the encoded data.

The fourth step includes a sub-step of calculating a block-based encoding bit rate from the encoding bit rate, a sub-step of comparing the block-based encoding bit rate to a rate of bits generated on the block basis, a sub-step of controlling the quantization step size of a block to be encoded next responsive to the result of comparison, and a sub-step of encoding the input video signals using the quantization step size for generating the encoded data.

The third step includes a sub-step of calculating the information on encoding difficulty specifying the degree of encoding difficulty from the information on picture characteristics and the information on the amount of generated bits, and a sub-step of determining the encoding bit rate, with the pre-set time interval as a unit, in proportion to the information on encoding difficulty within the range of the total amount of the usable data.

DESCRIPTION OF PREFERRED EMBODIMENTS

Figure 1:
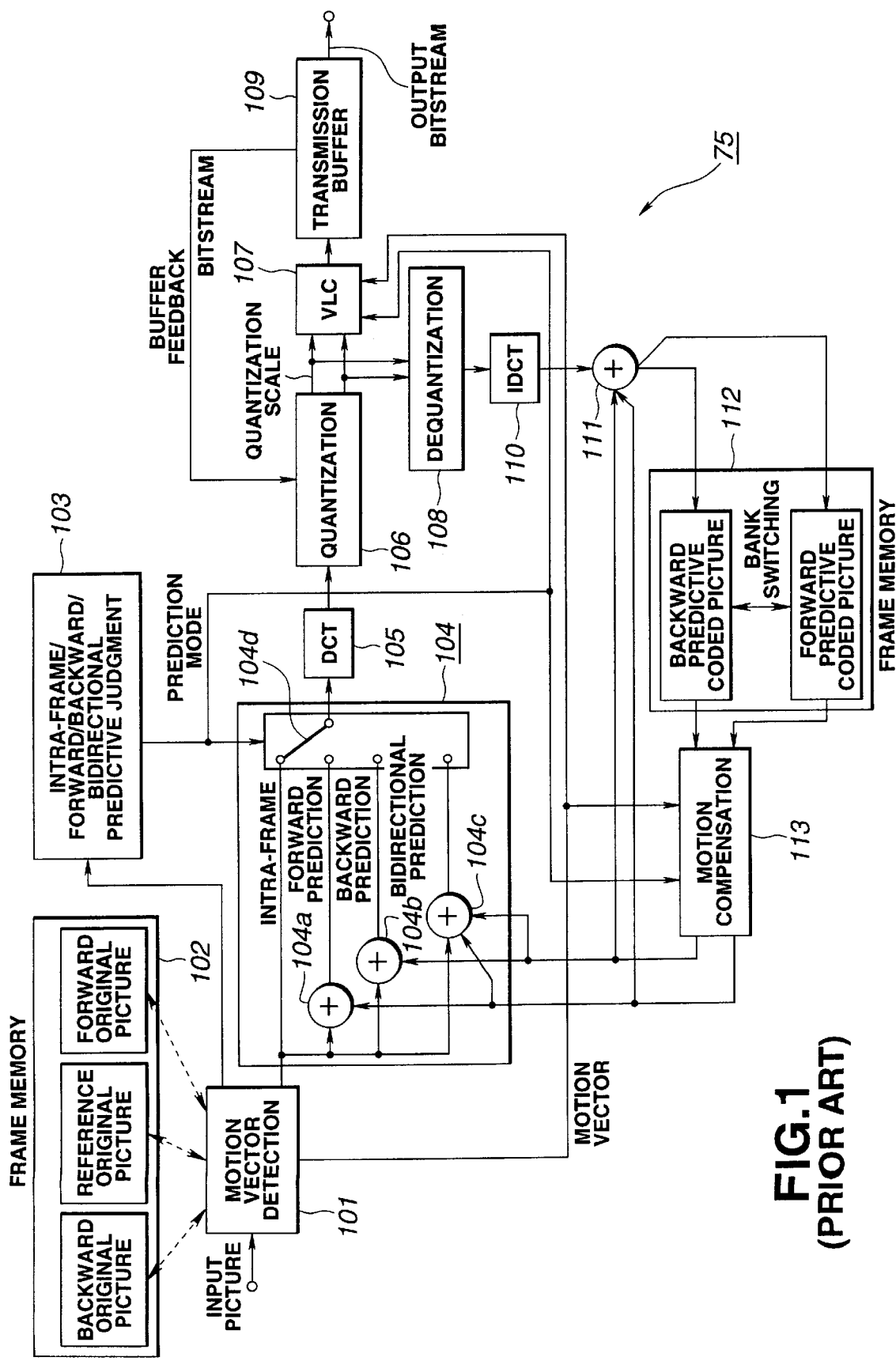
FIG. 1 is a block diagram showing an example of a conventional encoder circuit configuration.

Referring to the drawings, certain preferred embodiments of a picture encoding method, a picture encoding apparatus and a picture recording medium will be explained in detail.

(1) First Embodiment

Figure 3:
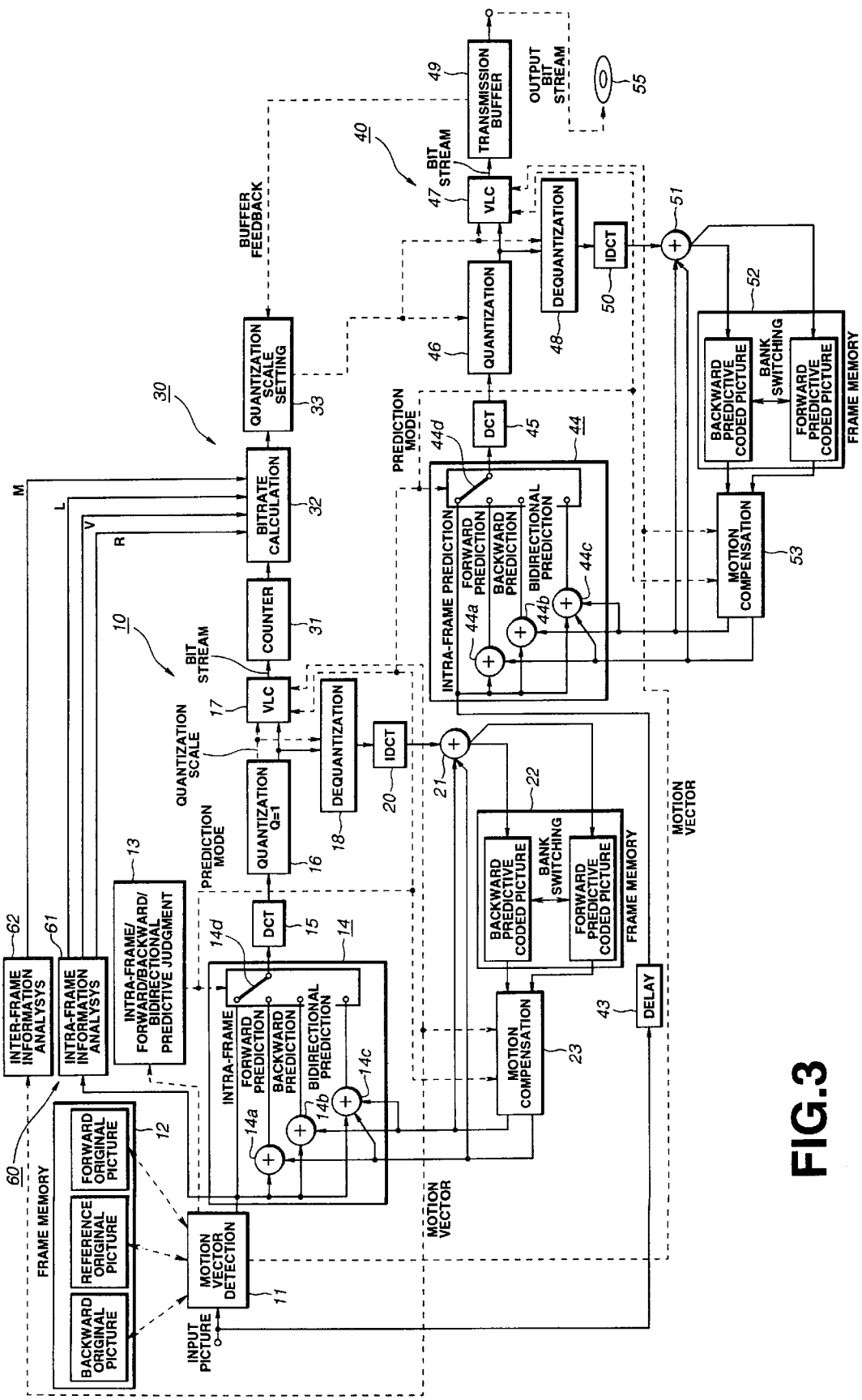
FIG. 3 is a block diagram showing a circuit structure showing essential portions of a picture encoding apparatus according to a first embodiment of the present invention.

Referring to FIG. 3, the picture encoding apparatus according to a first embodiment of the present invention includes a first encoding circuit 10 for encoding input video signals for generating first encoded data and a picture analysis circuit 60 for finding statistic properties or picture characteristics of input video signals. The picture encoding apparatus also includes an encoding control circuit 30 for finding the encoding rate every pre-set time interval based upon the amount of the first encoding data from the first encoding circuit 10 every pre-set time interval, statistic data or the information on picture characteristics from the picture analysis circuit 60 and the total amount of usable data. The picture encoding apparatus further includes a second encoding circuit 40 encoding the input video signals every pre-set time interval based upon the encoding rate from the encoding control circuit 30 for generating second encoded data.

The picture analysis circuit 60 includes an intra-frame information analysis circuit 61 and an inter-frame information analysis circuit 62, as shown in FIG. 3. The intra-frame information analysis circuit 61 calculates the statistic information on, for example, luminance, chroma or flatness, as the information on picture characteristics of the input picture, while the inter-frame information analysis circuit 62 calculates, as the information on the picture characteristics of the input picture, the statistic information on, for example, the amount of movement of a moving picture.

Referring to FIG. 3, the picture analysis circuit 60 includes an intra-frame information analysis circuit 61 and an inter-frame information analysis circuit 61. The intra-frame information analysis circuit 61 calculates the statistic information on luminance, chroma or flatness, for example, as the information on input picture characteristics. The inter-frame information analysis circuit 62 calculates the statistic information on the amount of movement of the moving picture, for example, as the information on input picture characteristics.

By way of illustrative examples of the information on the picture characteristics, a mean value L of a luminance signal Y every pre-set time interval is calculated as the statistic information on the luminance of the input picture, while a mean value R of the chroma signal Cr every pre-set time interval is calculated as the statistic information on the chromaticity of the input picture. On the other hand, a variance V of the luminance signal Y every pre-set time interval is calculated as the statistic information of flatness of the input picture, while a mean value M of the motion vector every pre-set time interval is calculated as the statistic information of the amount of movement of the input picture.

Referring to FIG. 3, the first encoding circuit 10 includes a set of frame memories 12 for storing input picture data as input picture signals, and a motion vector detection circuit 11 for detecting the motion vector of input picture data based upon picture data stored in the set of frame memories 12. The first encoding circuit 10 also includes a frame memory 22 for storing prediction picture data and a motion compensation circuit 23 for motion-compensating the prediction picture data read out from the frame memory 22 based upon the motion vector from the motion vector detection circuit 11. The first encoding circuit 10 also includes a predictive encoding circuit 14 for predictive encoding input picture data based upon motion-compensated prediction picture data from the motion compensation circuit 23, and a discrete cosine transform (DCT) circuit 15 for encoding prediction errors from the predictive encoding circuit 14 by DCT for generating coefficient data. The first encoding circuit 10 also includes a quantization circuit 16 quantizing the coefficient data from the DCT circuit 15 at a pre-set quantization step size for generating quantized data. The first encoding circuit 10 also includes a variable length encoding (VLC) circuit 17 for variable length encoding the quantized data from the quantization circuit 16 for outputting variable length encoded data. The first encoding circuit 10 also includes a dequantization circuit 18 for dequantizing the quantized data from the quantization circuit 16 for generating coefficient data. The first encoding circuit 10 also includes an inverse discrete cosine transform (IDCT) circuit 20 for decoding the coefficient data from the dequantization circuit 18 by IDCT for regenerating the differences. The first encoding circuit 10 also includes an addition circuit 21 for summing the differences from the IDCT circuit 20 to the motion-compensated prediction picture data from the motion compensation circuit 23 for generating prediction picture data for the next input picture data and for supplying the prediction picture data to the frame memory 22.

Referring to FIG. 3, the second encoding circuit 40 includes a delay unit 43 for delaying input video data, and a frame memory 52 for storing prediction picture data. The second encoding circuit 40 also includes a motion compensation circuit 53 for motion-compensating the prediction picture data read out from the frame memory 52 on the basis of the motion vector from the motion vector detection circuit 11, and a predictive encoding circuit 44 for prediction coding input picture data delayed by the delay element 43. The second encoding circuit 40 also includes a DCT circuit 45 for encoding and discrete cosine transforming the differences from the prediction coding circuit 44 for generating coefficient data and a quantization scale setting circuit 33 for setting the quantization step size based upon the encoding rate from the encoding controlling circuit 30. The second encoding circuit 40 also includes a quantization circuit 46 for quantizing the coefficient data from the DCT circuit 45 with the quantization step size from the quantization scale setting circuit 33 for generating quantized data, and a variable length encoding circuit 47 for variable length encoding the quantized data from the quantization circuit 46 for outputting variable length encoded data. The second encoding circuit 40 also includes a transmission buffer memory 49 for transiently storing variable length encoded data from the variable length encoding circuit 47 for outputting the stored data at a pe-set bit rate, and a dequantization circuit 48 for dequantizing the quantized data from the quantization circuit 46 for reproducing the coefficient data. The second encoding circuit 40 also includes an IDCT circuit 50 for decoding the coefficient data from the dequantization circuit 48 by IDCT for reproducing the differences. The second encoding circuit 40 further includes an addition circuit 51 for summing the differences from the IDCT circuit 50 to the motion-compensated prediction picture data from the motion compensation circuit 53 to generate prediction picture data for the next input picture data and for supplying the prediction picture data to the frame memory 52.

With the present picture encoding apparatus, the first encoding circuit 10 processes a sequence of input picture data by encoding, for example, predictive encoding, DCT, quantization at a pre-set quantization step size or variable length encoding. The second encoding circuit 40 then finds the encoding bit rate by the encoding control circuit 30 and encodes the input picture data based upon the encoding bit rate thus found. The sequence means a totality of frames recorded on a sole recording medium, such as a motion picture or a broadcasting program. If the recording medium is used in a split form, the sequence may be the totality of frames recorded for each split area. The encoding control circuit 30 finds the encoding bit rate every pre-set time interval for the above sequence based upon the data amount, in terms of a pre-set time duration, of the variable length encoded data, which is the first bitstream obtained by the first variable length encoding circuit, a mean value L and a variance V, in terms of a pre-set time interval, of the luminance signal Y of the input picture signals, as found by the picture analysis circuit 60, and a mean value R, in terms of a pre-set time interval, of the amount of the motion vectors, data capacity of a picture recording medium 55, such as an optical disc, a magnetic disc or a magnetic tape, or a bit rate (transfer rate) of the transmission channel. In addition, the second encoding circuit 40 quantizes the input picture data with the quantization step size derived from the encoding bit rate when again processing the input picture data by predictive encoding, DCT, quantization or VLC for generating variable length encoded data as a second bitstream.

Figure 4:
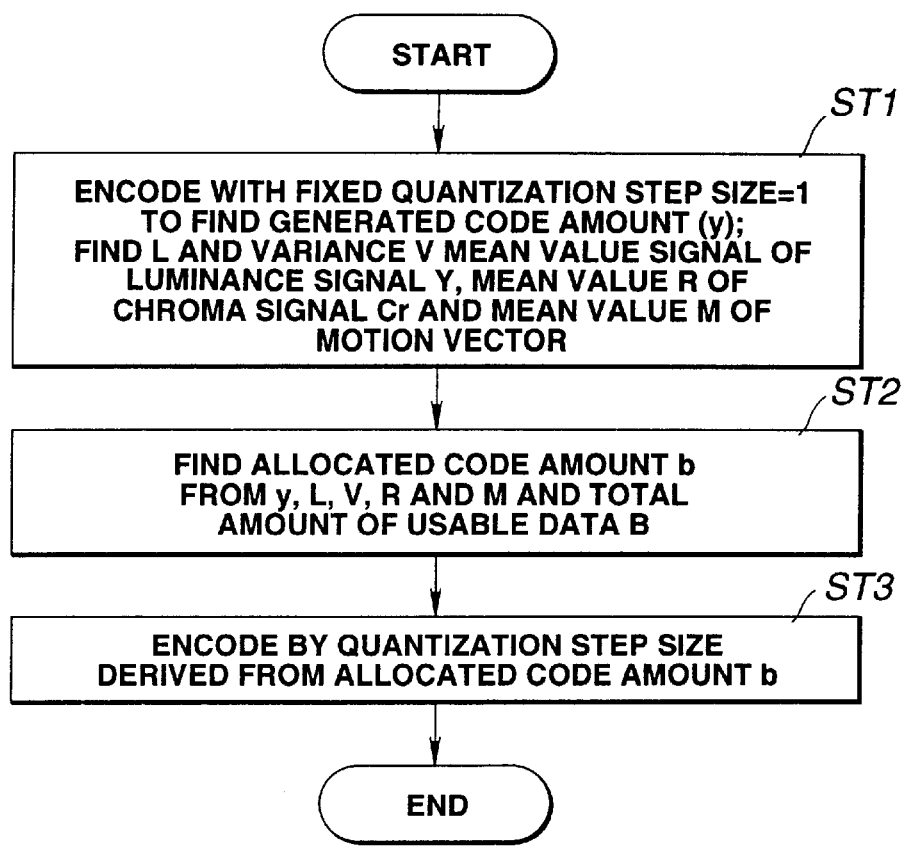
FIG. 4 is a flowchart for illustrating the operation of a first encoding circuit constituting the picture encoding. apparatus according to a first embodiment of the present invention.

Referring to a flowchart of FIG. 4, an illustrative operation of the first encoding circuit 10 constituting a picture encoding apparatus according to the above-described first embodiment is explained in detail.

In the flowchart of FIG. 4, the quantization circuit 16 of the first encoding circuit 10 of FIG. 3 quantizes at step ST1 the coefficient data supplied from the DCT circuit 15, with the quantization step size of, for example, 1, to generate quantized data. A counter 31 of the encoding control circuit 10 counts the data volume of the variable length encoded data obtained by variable length encoding the coefficient data from the DCT circuit 15 (first bitstream), every pre-set time period, such as every macro-block, to find an amount y of generated codes every macro-block. The picture analysis circuit 60 finds the variance V and the mean value L of the luminance signal Y in the macro-block, mean value R of the chroma signal Cr and the mean value M of the motion vector of the macro-block.

At the next step ST2, the bit rate calculating circuit 32 finds a code amount b allocated to each macro-block based upon the values y, L, V, R and M and upon the total amount of the usable data B. Specifically, the bit calculation circuit 32 finds the encoding difficulty d based upon the values y, L, V, R and M and finds the amount of the allocated codes b based upon the encoding difficulty d and the total amount of the usable data B.

At step ST3, the quantization circuit 46 of the second encoding circuit 40 quantizes the coefficient data supplied for the DCT circuit 45 with the quantization step size derived from the amount of allocated codes in order to generate quantized data.

Figure 5:
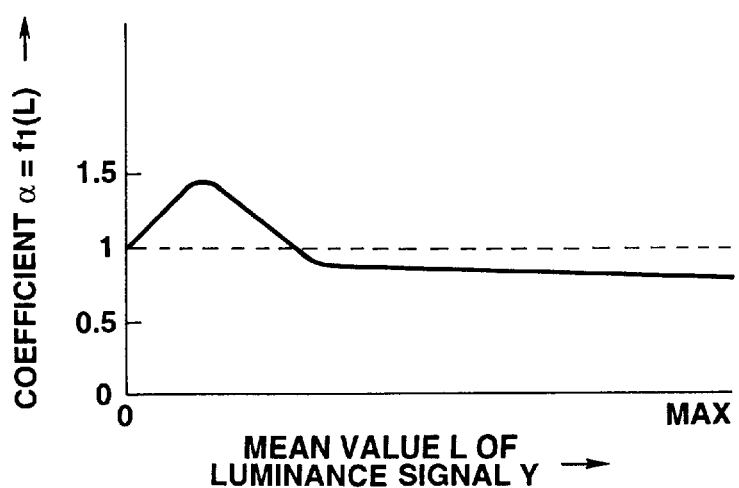
FIG. 5 is a graph showing the relation between the mean value L of the luminance signal Y and a function f1 of a coefficient $\alpha$.

Referring to FIG. 5, the operation of the first encoding circuit 10 will be explained in further detail.

The input picture data is transiently stored in the set of frame memories 12 so as to be read out therefrom in accordance with a pre-set block format.

The motion vector detection circuit 11 reads out the needed picture data from the set of frame memories 12 on the macro-block basis in order to detect the motion vector. That is, the motion vector detection circuit 11 detects the motion vector of the current reference picture on the macro-block basis, using the forward original picture and/or the backward original picture stored in the set of frame memories 12. In detecting the motion vector, such a motion vector is employed which will give the least value of the sums of the absolute values of the macro-block based inter-frame differences. The motion vector thus detected is supplied to the motion compensation circuits 23 or 53 while the sum of the absolute values of the macro-block based inter-frame differences is supplied to the intra-frame/forward/backward/bi-directional prediction decision circuit 13.

The intra-frame/forward/backward/bi-directional prediction decision circuit 13 sets the prediction mode for the reference block, based upon this value, and controls the prediction encoding circuit 14 for switching between intra-frame/forward/backward/bi-directional prediction in terms of blocks as a unit based upon the thus set prediction mode.

The prediction encoding circuit 14 includes addition circuits 14a, 14b and 14c and a changeover witch 14d, as shown in FIG. 3. The prediction encoding circuit 14 selects the input picture data itself if the encoding mode is an intra-frame encoding mode, while selecting the pixel-based difference data of input picture data for the respective prediction pictures if the encoding mode is the intra-frame/forward/backward/bi-directional prediction mode, respectively. The selected data are transmitted to the DCT circuit 15.

The DCT circuit 15 transforms the input picture data or the difference data supplied from the changeover switch 14d by DCT on the block basis, by exploiting two-dimensional correlation of video signals, and transmits the resulting coefficient data to the quantization circuit 16.

The quantizes the coefficient data supplied from the DCT circuit 15, with a pre-set quantization step size, such as with a quantization step size of 1, and transmits the resulting quantized data to the VLC circuit 17 and to the dequantization circuit 18.

The variable length encoding circuit 17 variable length encodes the quantized data along with the quantization step size, prediction mode and the motion vector and transmits the resulting variable length encoded data as the first bit stream to the encoding control circuit 30.

The encoding control circuit 30 includes a counter 31 for counting the data quantity of the variable length encoded data from the VLC circuit 17 every pre-set time interval, and a bit rate calculating circuit 32 for finding the amount of allocated codes per a pre-set time based upon the total amount of the usable data, as shown in FIG. 3. The counter 31 counts the data volume of the first bitstream every pre-set time, for example, on the macro-block basis, and transmits the amount of the generated codes to the bit calculation circuit 32.

The bit rate calculation circuit 32 finds the amount of allocated codes allocated on the macro-block basis, that is the mean encoding rate over the macro-block time, on the basis of the macro-block based amount of the generated codes, the variance V and the mean value L of the luminance signal Y of a given macro-block, the mean value R of the chroma signal Cr of the macro-block, the mean value M of the motion vector of the macro-block, and the total amount of usable data, and transmits the amount of the allocated codes to the quantization scale setting circuit 33 of the second encoding circuit 40.

Specifically, the bit rate calculating circuit 32 finds coefficients $\alpha i$, $\beta i$, $\gamma i$ and $\theta i$, which reflect the subjective impression of a picture pattern from the characteristic of the functions f1, f2, f3 and f4 to the encoding difficulty di, and finds the encoding difficulty di by the products of these coefficients and yi, as shown in the equation 1:

$\alpha i = f1(Li)$
$\beta i = f2(Ri)$
$\gamma i = f3(Vi)$
$\theta i = f4(Mi)$ $$di = \alpha i \times \beta i \times \gamma i \times \theta i \times yi \quad (1)$$

Referring to FIGS. 5 to 8, illustrative examples of characteristics of the functions f1, f2, f3 and f4 will be explained.

FIG. 5 shows characteristics of the function f1 representing the coefficient $\alpha$ for the mean value L of the luminance signal Y. In FIG. 5, the abscissa denotes the mean value L which is 0 for black and lightest for MAX. In general, the encoding noise is most perceptible to the eye of the human being if a picture is dark. However, if the picture is darker than a pre-set level, the encoding noise becomes hardly perceptible because of excessive darkness. In view of these characteristics, a is set to 1 near L=0, while a has a peak with the level of L for which the deterioration is most perceptible to the eye of the human being. For L larger than this, the value of $\alpha$ is decreased gradually. If $\alpha$ is 1 or larger, the encoding difficulty d is increased, whereas, if $\alpha$ is not more than 1, the encoding difficulty d is decreased. Meanwhile, the mean value of the luminance signal Y for the i'th macro-block is Li and the coefficient $\alpha i$ for this i'th macro-block is f1(Li).

Figure 6:
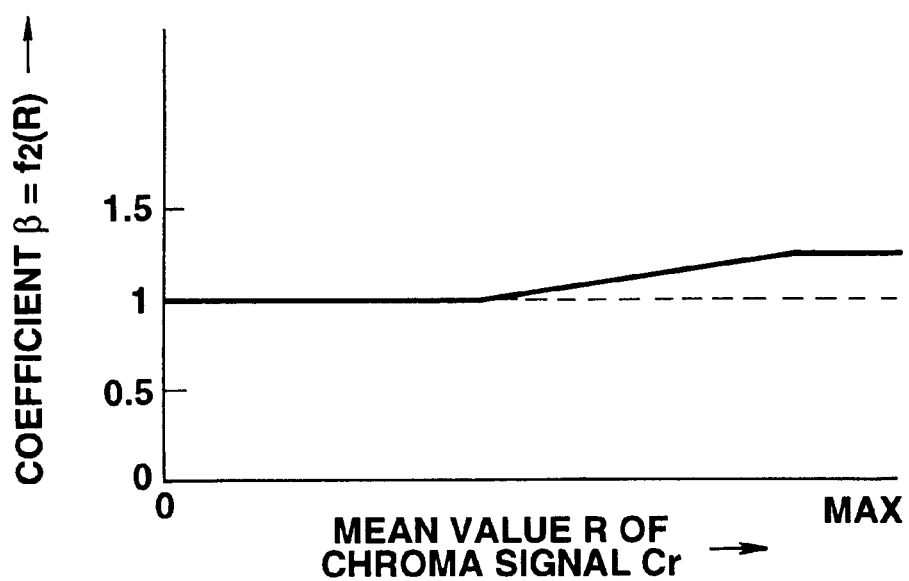
FIG. 6 is a graph showing the relation between the mean value R of the chroma signal Cr and a function f2 of a coefficient $\beta$.

FIG. 6 shows characteristics of a mean value R of chroma signals Cr and coefficients P. In FIG. 6, the abscissa denotes R, where 0 and MAX stand for grey and and the pure red, respectively. In general, the human eye perceives deterioration in red most acutely. Based on this, the value of 3 is set so as to be the larger the larger the value of R, with the value of I being not less than 1. The mean value of the chroma signal Cr of the i'th macro-block is Ri, with the coefficient $\beta i$ for this i'th macro-block being f2(Ri).

Figure 7:
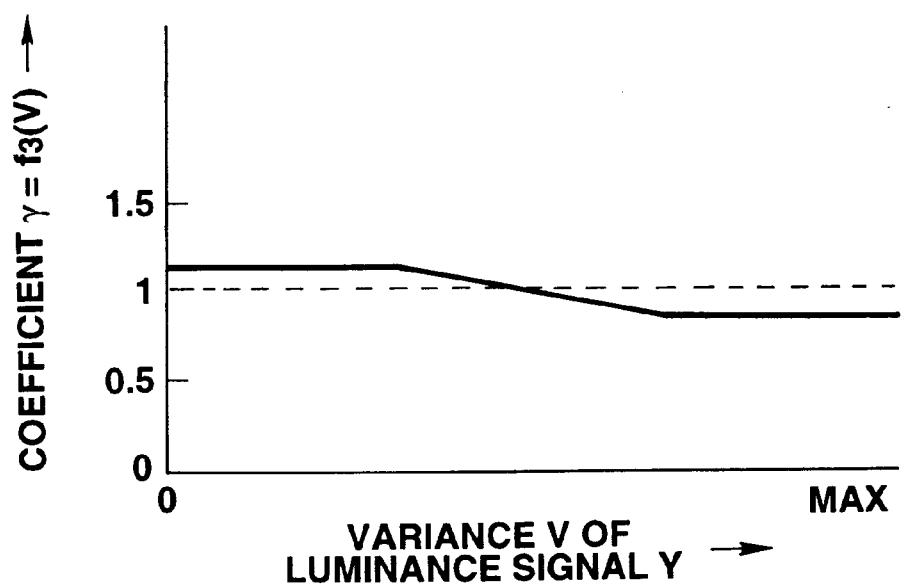
FIG. 7 is a graph showing the relation between the variance V L of the luminance signal Y and a function f3 of a coefficient $\gamma$.

FIG. 7 shows characteristics of the variance V of the luminance signal Y and the function f3 of the coefficient $\gamma$. In FIG. 7, the abscissa denotes V which is flat with 0 and which is most random in picture pattern for MAX. In general, the encoding noise is most perceptible to the eye of the human being, while deterioration is imperceptible in a random picture pattern portion. In view of these characteristics, the value of $\gamma$ is of a smaller value less than 1 and the encoding difficulty d is of a smaller value the larger the value of V. The variance Vi of the luminance signal Y for te i'th macro-block i Vi, while the coefficient $\gamma i$ for this i'th macro-block is f3(Vi).

Figure 8:
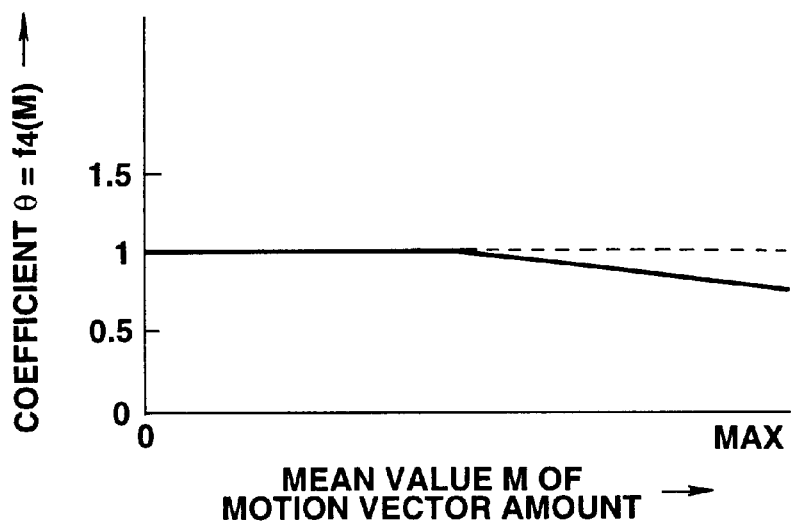
FIG. 8 is a graph showing the relation between the mean value M of the amount of the motion vector and a function f4 of a coefficient $\theta$.

FIG. 8 shows the characteristics of the mean value M of the motion vector amount and the function f4 of the coefficient $\theta$. In FIG. 8, the abscissa denotes M which is 0 if there is no motion and which becomes MAX if the motion is maximum. In general, the eye of the human being cannot follow up with the fast movement, such that picture deterioration becomes hardly perceptible. In view of these characteristics, the larger the value of M, the smaller is to be the value of $\theta$ which is less than unity for decreasing the encoding difficulty d. If the macro-block being considered is intra-frame coded, $\theta = 1$. The mean value of the amount of the motion vector and the coefficient $\theta i$ for the i'th macro-block are Mi and f4(Mi), respectively.

The coefficients $\alpha$, $\beta$, $\gamma$ and $\theta$, thus found, are multiplied by the amount of generated codes y to find a coding difficulty d. As for the i'th macro-block, coefficients $\alpha i$, $\beta i$, $\gamma i$ and $\theta i$ are found and multiplied by the amount of generated codes yi to find the encoding difficulty di.

If the amount of allocated codes for the i'th macro-block is bi and this amount of the allocated codes is set so as to be proportionate to the coding difficultly di, as shown by the equation (2):

$$bi = a \times di + c \quad (2)$$

the total amount of data B may be found by adding the amount of allocated codes bi of the totality of the macro-blocks, as indicated by the equation (3):

$$B = \sum_{i=0}^{N-1} bi = \sum_{i=0}^{N-1} (a \times di + c) = a \times \sum_{i=0}^{N-1} di + N \times C \quad (3)$$

where a and c are constants.

It is noted that the constant c is a value pre-determined depending upon the mean bit rate in the above sequence. The constant a may be found from the following equation (4):

$$a = (B - N \times C) \div \sum_{i=0}^{N-1} di \quad (4)$$

If this constant a is substituted into the equation (2), the amount of bit allocation bi for the i'th macro-block may be found from the equation (5):

$$bi = di \times (B - N \times C) \div \sum_{i=0}^{N-1} di + C \quad (5)$$

The sum of bi for the totality of macro-blocks making up a slice represents the amount of the allocated codes for the slice. The sum of bi for the totality of macro-blocks making up a frame represents the amount of the allocated codes for the frame. Thus the bit rate calculating circuit 32 increases the amount of the allocated codes for a frame of a complex pattern, while decreasing the amount of the allocated codes for a frame of a simple pattern.

The dequantization circuit 18 dequantizes quantized data supplied from the quantization circuit 16, with a quantization step size of 1, for regenerating coefficient data corresponding to an output of the DCT circuit 15 and which is added to with the quantization distortion. This coefficient data is supplied to the IDCT circuit 20.

The IDCT circuit 20 converts the coefficient data by IDCT to reproduce input picture data corresponding to the output of the predictive encoding circuit 14 for the intra-frame encoding mode, while reproducing difference data for the forward/backward/bidirectional prediction mode and transmitting the reproduced data to the addition circuit 21.

The addition circuit 21 is supplied with motion-compensated prediction picture data from the motion compensation circuit 23 for the intra-frame/forward/backward/bi-directional prediction mode. The addition circuit 21 sums the prediction picture data to the difference data supplied from the IDCT circuit 20 to reproduce picture data corresponding to input picture data.

The picture data, thus reproduced, is stored in the frame memory 22 as prediction picture data. That is, the circuitry from the dequantization circuit 18 to the addition circuit 21 constitutes a local decoding circuit and writes the produced decoded picture in the frame memory 22 as a forward prediction picture or as a backward prediction picture. The set of frame memories 22 is comprised of plural frame memories which are bank-switched so that, for example, a sole frame is outputted as a forward prediction picture data or as a backward prediction picture data depending upon the picture to be encoded. In case of bidirectional prediction, forward prediction picture data and backward prediction picture data being outputted are averaged. These prediction picture data are wholly the same picture data as those of picture data reproduced by the picture decoding apparatus as later explained, so that, for the picture processed next time, forward/backward/bi-directional predictive coding is executed on the basis of the prediction picture.

The operation of the second encoding circuit 40 is now explained. Since the circuitry of the second encoding circuit 40 other than the quantization scale setting circuit 33, delay unit 43, quantization circuit 46 and the transmission buffer memory 49, operates in the same manner as the circuitry making up the above-described first encoding circuit 10, the corresponding description is omitted for simplicity.

The delay unit 43 delays the input picture data during the time which elapses until the encoding control signal is outputted from the encoding control circuit 30. The predictive coding circuit 44 and the DCT circuit 45 process the delayed input picture data with predictive encoding and DCT in accordance with the prediction mode supplied from the intra-frame/forward/backward/bi-directional prediction decision circuit 13 for generating coefficient data.

The quantization scale setting circuit 33 compares the amount of codes generated in a macro-block detected from buffer feedback from the transmission buffer 49 to the macro-block based amount of allocated codes.

If the amount of the codes allocated to a macro-block under consideration is larger than the macro-block based amount of the allocated codes, the quantization step size of the next macro-block is set to a larger value for suppressing the amount of generated codes in the next macro-block and, if the amount of the codes allocated to the macro-block under consideration is less than the macro-block based amount of the allocated codes, the quantization step size of the next macro-block is set to a smaller value for increasing the amount of generated codes in the next macro-block. In this manner, the amount of the generated codes of each macro-block in the second encoding approaches to the amount of the allocated codes to the respective macro-blocks. Although the amount of the allocated codes and the amount of the generated codes are controlled to approach to each other on the macro-block basis, it is also possible to effectuate control on the slice basis, on the frame basis or, as later explained, on the GOP (group-of-picture) basis.

In addition, it is possible for the quantization scale setting circuit 33 to increase the quantization step size to suppress the overflow, without regard to the results of comparison of the amount of the allocated codes to the amount of the generated codes, if the buffer feedback from the transmission buffer 49 indicates the impending overflow of the transmission buffer 48. Similarly, it is possible for the quantization scale setting circuit 33 to decrease the quantization step size to suppress the underflow, without regard to the results of comparison of the amount of the allocated codes to the amount of the generated codes, if the buffer feedback from the transmission buffer 49 indicates the impending underflow of the transmission buffer 48.

Although the amount of the generated codes and the amount of the allocated codes are compared in the above description on the macro-block basis for switching the quantization step size on the macro-block basis, it is possible to effectuate such switching on the slice basis, on the frame basis or on the GOP basis.

Although the amount of generated codes is detected in the above description from the stored amount in the transmission buffer 49, it may also be produced from an output of the VLC circuit 47. The quantization scale circuit 33 transmits the quantization step size, thus set, to the quantization circuit 46.

The quantization circuit 46 quantizes the coefficient data supplied from the DCT circuit 45 in accordance with the quantization step size supplied from the above-described quantization scale setting circuit 33 for generating quantized data.

The VLC circuit 47 variable length encodes the quantized data supplied from the quantization circuit 46 along with the quantization step size from the quantization scale circuit 33, the prediction mode from the intra-frame/forward/backward/bi-directional prediction decision circuit 13 and the motion vector from the motion vector detection circuit 11 and transmits the resulting variable length encoded data as the second bitstream to the transmission buffer 49.

Figure 9:
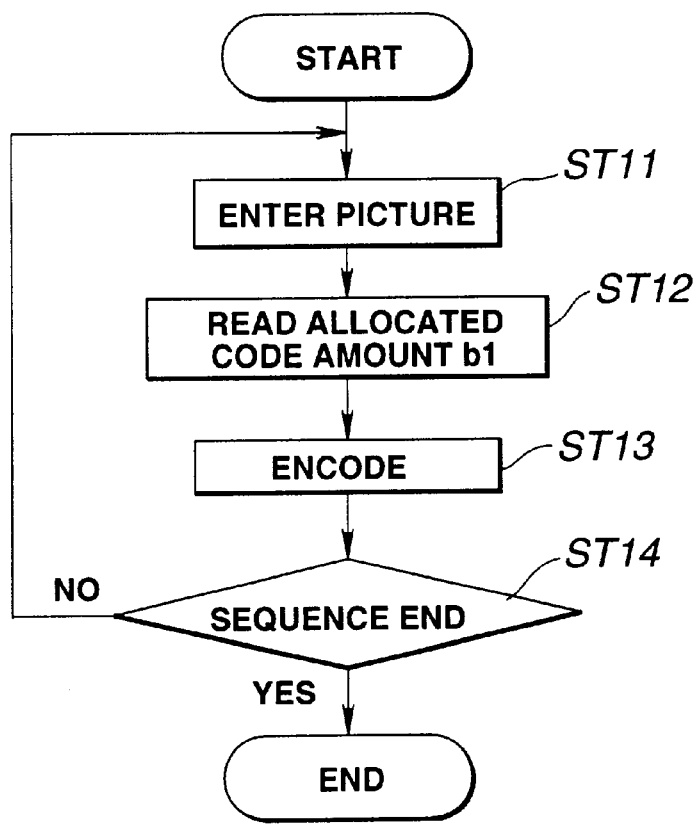
FIG. 9 is a flowchart for illustrating the operation of a second encoding circuit constituting a picture encoding apparatus according to the first embodiment of the present invention.

FIG. 9 schematically shows, in a flowchart, the operation of the second encoding circuit 40 of the picture encoding apparatus.

Referring to FIG. 9, if picture data is entered at step ST11 via delay unit 43, the quantization scale circuit 33 reads the amount of allocated codes for the frame being encoded from the encoding control circuit 30 at ST12. Processing then transfers to step ST13.

At step ST13, the circuitry from the predictive encoding circuit 44 to the VLC circuit 47 effectuates predictive coding and DCT on the picture data and quantizes coefficient data by the quantization step size derived from the amount of the allocated codes of the macro-block, while quantizing the coefficient data by the quantization step size derived from the amount of the allocated codes for the macro-block and variable length encoding the resulting quantized coefficient data. Processing then transfers to step ST14.

It is judged at step ST14 whether or not encoding of the totality of frames (sequence), to which the same picture size or the same mean bit rate are applied, has come to a close. If the result of judgment is affirmative, the processing comes to a close and, if otherwise, processing reverts to step ST11. Thus the variable length coding in which the encoding rate is varied on the frame basis is achieved, such that, if pictures (frames) with complex patters occur contiguously, the quantization step size is not varied significantly, as was the case with the conventional apparatus, so that a uniform high picture quality may be assured on the whole.

On the other hand, the dequantization circuit 48 dequantizes the quantized data supplied from the quantization circuit 46 with the quantization step size as employed in the quantization circuit 46 for regenerating coefficient data corresponding to the output of the DCT circuit 45 and which is added to with the quantization distortion. The dequantization circuit 48 transmits the resulting coefficient data to the IDCT circuit 50. That is, the circuitry from the dequantization circuit 48 to the addition circuit 51, making up the local decoding circuit, locally decodes quantized data outputted from the quantization circuit 46, and record the resulting decoded picture as the forward prediction picture or as the backward prediction picture in the frame memory 52. The picture data stored in the frame memory 52 is used as a prediction picture for the picture processed next.

If the transmission buffer memory 49, which may be provided optionally, is provided, it transiently stores the variable length encoded data and reads out the stored data at a constant bit rate for smoothing the variable length encoded data and outputting the smoothed data as a bitstream. The output bitstream from the transmission buffer memory 49 is multiplexed with, for example, encoded audio signals and synchronization signals, added to with error correction codes and modulated in a pre-set manner suitable for transmission and recording, so as to be then transmitted over a transmission path to a picture decoding apparatus or recorded on a picture recording medium 55, such as an optical disc, magnetic disc or a magnetic tape, as shown in FIG. 3. That is, since variable length encoding has been done in the second encoding circuit 40 with a larger amount of allocated codes bi and a smaller amount of allocated codes bi for a complex picture and for a simple picture, respectively, it becomes possible to elongate the recording time of the picture recording medium 55, while there is no necessity of applying a fixed rate which is high on the whole for evading significant deterioration in picture quality for the picture of complex pattern as in the case of the conventional apparatus.

If the transmission buffer memory 49 is not provided, or if a memory of a small capacity is provided, an output bitstream is supplied at a variable bit rate to the picture recording medium 55. By employing a recording apparatus having a variably controllable recording rate and a maximum recording rate exceeding the maximum bit rate of the output bitstream, the picture signals of one sequence may be recorded with a data volume which does not exceed the total recording capacity of the recording medium 55 or the total amount of the usable data B and which moreover is close to the total amount of the usable data B. Thus it becomes possible to allocate a larger portion and a smaller portion of the total recording capacity of the picture recording medium 55 to the complex picture and to the simple picture, respectively, for achieving optimum effective utilization of the recording capacity of the recording medium and satisfactory picture quality on the whole.

It is seen from the above-described embodiment of the present invention that, with the first encoding circuit 10, a standard quantization value is pre-set every pre-set time period for calculating the encoding difficulty and the amount of codes is found by quantizing the DCT coefficients solely by fixed quantization without managing control based upon the stored volume in the buffer. In addition to the volume of the encoding information corresponding to the fixed standard value of quantization, the information associated with picture characteristics, such as lightness, flatness, chromaticity or picture movement, is calculated every pre-set time interval. The bit rate calculation circuit finds the code amount, allocated every pre-set time interval, such as the mean encoding rate for each frame period, based upon the information associated with the picture characteristics, volume of encoded information and the total amount of the usable data.

For the lightness and flatness of the picture, the mean value L of the luminance signal Y, calculated every pre-set time period, and the variance V of the luminance signal Y, calculated every pre-set time period, may be employed, respectively, whereas, for the chromaticity and the picture movement, the mean value R of the chroma signal Cr, calculated every pre-set time period, and the mean value M of the amounts of the motion vector of the macro-block under consideration, calculated every pre-set time period, may be employed, respectively.

The second encoding circuit 40 sets a target amount of codes for the amount of generated codes, obtained by provisional coding, that is first coding, every pre-set time interval, and controls the quantization step size or the quantization value for encoding a picture. That is, the quantization step size is diminished in a portion of a dark picture where the noise is perceivable more acutely. Similarly, the quantization step size is diminished for a flatter portion or a higher red level portion of a picture. On the other hand, the quantization step size is enlarged for a larger amount of the motion vector, that is for a faster picture movement.

By the above-described encoding, designed for reflecting characteristics of the visual sense of the human being, it becomes possible to prohibit the encoding noise, such as block or mosquito noise, from becoming apparent even in case the subjective impression of the encoded picture is inferior, as in a dark picture portion, red-hued picture portion or a flat picture portion.

(2) Second Embodiment

In the above-described first embodiment, the amount of allocated codes per pre-set time, that is the mean encoding rate per pre-set time, ia obtained on the macro-block basis. That is the above pre-set time corresponds to the macro-block. This, however, is not limitative of the present invention. Thus the above pre-set time may correspond to the frame. In this case, a set of parameters yi, Li, Ri, Vi and Mi in the above equations (1) to (5) are calculated with one frame time being set as the above pre-set time. The amount of the allocated codes bi may be found by the equation (5) on the basis of the set of parameters.

In calculating Li, Ri, Vi and Mi in the second embodiment, the mean value over the entire macro-blocks in a frame or the mean value over part of the macro-blocks in a frame, may be employed. The latter method is effective when handling a picture of a letterbox format, that is a format in which upper and lower portions of a frame are masked in black zones for representing a 16:9 picture on a 4:3 format screen. In this case, Li, Ri, Vi and Mi are calculated for macro-blocks constituting an effective mid portion of the picture excluding the upper and lower picture portions masked by black zones. It is possible with this method to comprehend the properties of the effective mid portion of the frame more accurately, and to omit the calculations for the portions masked with the black zones.

With the second encoding circuit 40 of the second embodiment, in contradistinction from the above-described first embodiment, it is necessary to calculate the macro-block based allocated code amount in the quantization scale setting circuit 33. In such case, the quantization scale setting circuit 33 finds the code amount allocated on the macro-block basis from the frame-based amount of the allocated codes bi by dividing the macro-block based amount of the allocated codes bi by the number of the macro-blocks in one frame. The buffer feedback control from the transmission buffer 49 is similar to that in the above-described first embodiment.

Since the amount of allocated codes is found on the basis of the frame in the present second embodiment, the memory volume necessary for storing all bi values may be saved as compared to the above-described first embodiment.

(3) Third Embodiment

In the above embodiments, the amount of allocated bits per pre-set time, that is the mean encoding rate per pre-set time, are produced on the frame basis with the frame being set as the above pre-set time. This, however, is not limitative of the present invention. For example, the GOP (group-of-pictures) in the MPEG (Moving Picture Expert Group) may also be set as the pre-set time. It is noted that the MPEG is the appellation of the moving picture encoding system being searched by the Work Group 11 of the Sub-Committee 29 in Joint Technical Committee (JTC) 1 of International Organization for Standardization (ISO) and International Electrotechnical Commission (IEC).

In the present third embodiment, each GOP in the MPEG is made up of at least one I-picture and plural P-pictures or B-pictures, that is non-I-pictures. If the GOP is made up of one I-picture, four P-pictures, appearing every three pictures, and ten B-pictures, the encoding controlling circuit 30 finds an amount of allocated codes in terms of a GOP as a unit. The I-picture is an intra-field or intra-frame coded picture, while the P-picture is predictable only from the forward direction and coded by inter-frame or inter-field coding, and the B-picture is predictable from the forward and/or backward directions and coded by inter-field or inter-frame coding.

Figure 11:
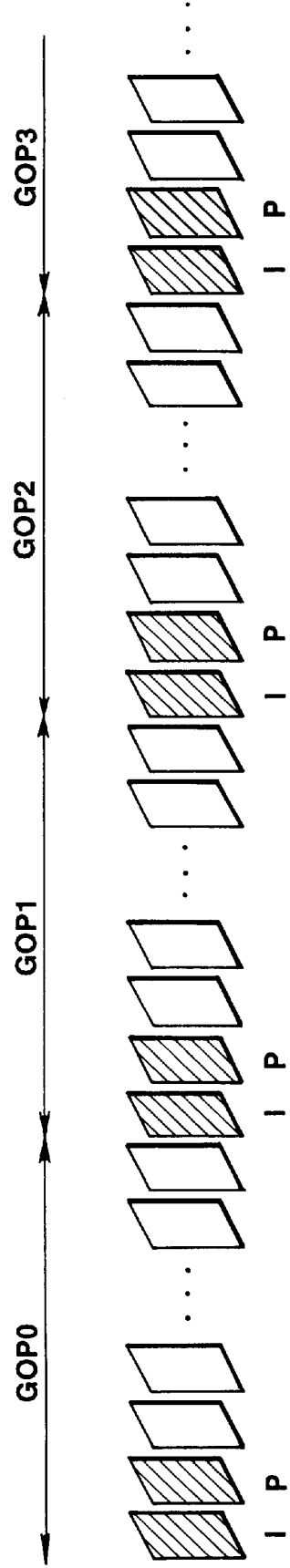
FIG. 11 illustrates plural pictures for illustrating encoding control signals on the GOP basis.

In the first encoding circuit 10, optional two consecutive pictures in a GOP are set as an I-picture and P-picture, with the number of pictures making up the GOP as a period, and picture data of the I-picture and the P-picture are processed with predictive coding, DCT and VLC, with the quantization step being set to, for example, 1, for generating variable length coded data. This variable length coded data is supplied to the encoding controlling circuit 30, as shown for example in FIG. 11. The two pictures are set as the I-picture and as the P-picture for checking pattern complexity and inter-frame correlation. Specifically, the pattern complexity may be known from the amount of generated codes of the I-picture, while the inter-frame correlation may be known from the amount of generated codes of the P-picture.

The encoding control circuit 30 counts an amount of data bitIj of the I-picture and an amount of data bitPj of the P-picture for each GOP, and finds the amount of generated codes GOPyj, based upon these amounts bitIj and bitPj and the number of P-pictures N constituting the GOP, for each GOP, as shown by the equation (6):

$$GOPyj = bitIj + N \times bitPj \qquad (6)$$

where j=0, 1, 2, . . . .

The encoding control circuit 30 finds the GOP-based amount of allocated codes based upon the GOP-based amount of generated codes GOPyj and the total amount of the usable data and transmits the amount of allocated codes to the second encoding circuit 40.

Specifically, with the total number of GOPs of M, total amount of the usable data B, the amount of generated codes of the j'th GOP of GOPyj, j=0, 1, 2, . . . M-1, and a mean value of the amount of motion vector of Mj, coefficients αj, βj, γj and θj, reflecting the subjective impression in coding difficulty GOPdj, are found from functions f1, f2, f3 and f4. The coding difficulty GOPdj is found from the product of these coefficients and GOPdj, as shown in the equation (7):

$$\alpha j = f1(Lj)$$
$$\beta j = f2(Rj)$$
$$\gamma j = f3(Vj)$$
$$\theta j = f4(Mj)$$

$$GOPdj = \alpha j \times \beta j \times \gamma j \times \theta j \times GOPyj \qquad (7)$$

The characteristics of the functions f1 to f4 are the same as those shown in FIGS. 5 to 8.

If the amount of the allocated codes for the j'th GOP is GOPbj and this amount of the allocated codes GOPbj is set so as to be proportionate to the encoding difficulty, as shown by the equation (8):

$$GOPbj = a \times GOPdj + c \qquad (8)$$

the total mount of data B may be found by summing the amounts of the allocated codes GOPbj of the entire GOP, as shown by the equation (9):

$$B = \sum_{j=0}^{M-1} GOPbj \qquad (9)$$
$$= \sum_{j=0}^{M-1} (a \times GOPdj + C)$$
$$= a \times \sum_{j=0}^{M-1} GPOdj + M \times C$$

where a, c are constants. The constant c is pre-determined responsive to the mean bit rate for a sequence. The constant a may be found by the equation (10):

$$a = (B - M \times C) \div \sum_{j=0}^{M-1} GOPdj \qquad (10)$$

Substituting the constant a into the equation (8), the amount of the allocated codes GOPbj for the j'th GOP may be found from the equation (11):

$$GOPbj = GOPdj \times \left( (B - M \times C) \div \sum_{j=0}^{M-1} GOPdj \right) + C \qquad (11)$$

Thus it is possible for the second encoding circuit 30 to increase the amount of the allocated codes GOPbj for a GOP having pictures with complex patterns or exhibiting low inter-frame correlation and to decrease the amount of the allocated codes GOPbj for a GOP having pictures with simple patterns or exhibiting high inter-frame correlation.

Figure 12:
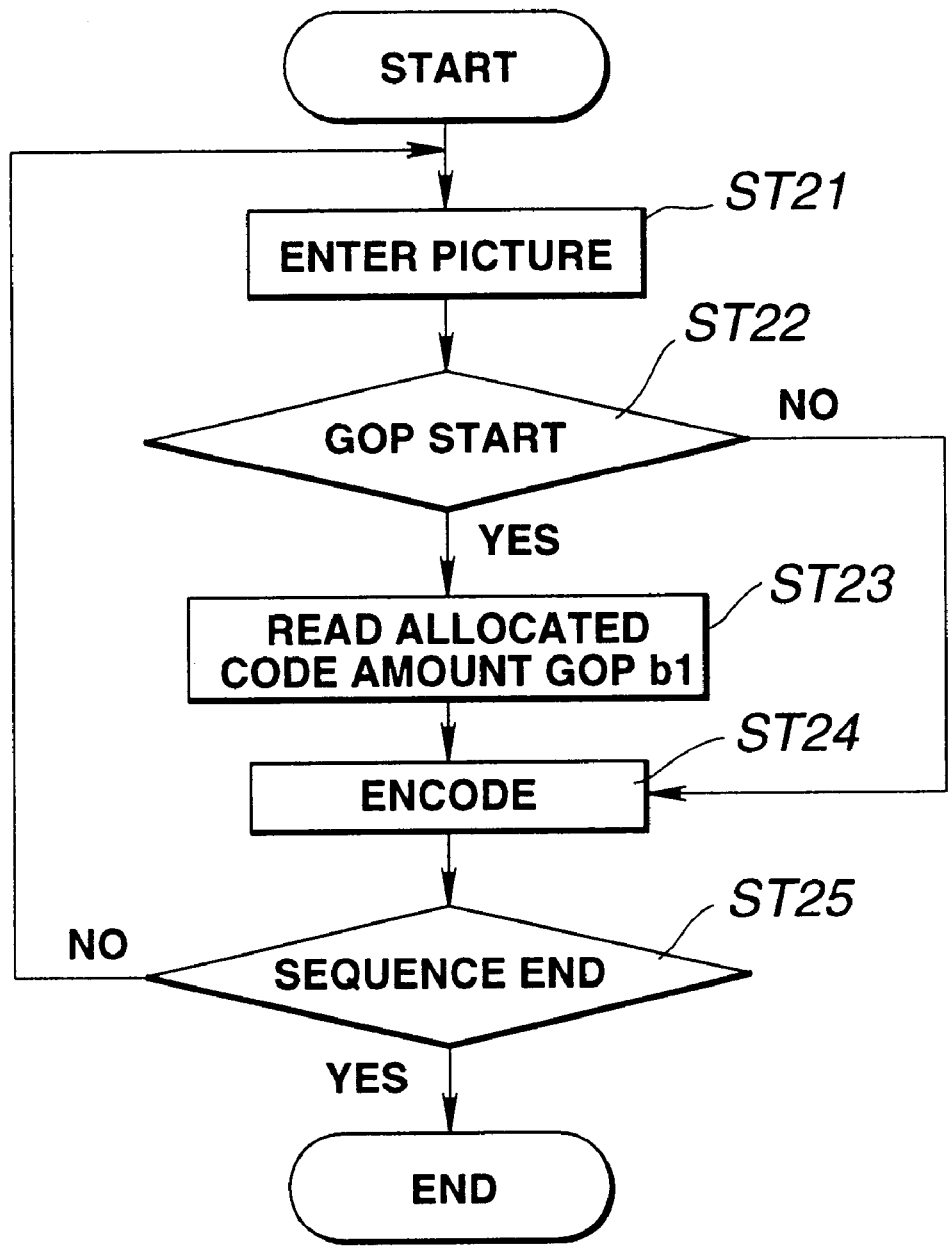
FIG. 12 is a flowchart for illustrating the operation of a second encoding circuit constituting a picture encoding apparatus according to a third embodiment of the present invention.

Referring to FIG. 12, if picture data is entered at step ST21 via delay unit 43, the second encoding circuit 40 judges at step ST22 whether or not the picture data currently entered is a leading picture of the GOP. If the result of judgment is affirmative, the second encoding circuit 40 transfers to step ST23 and, if otherwise, transfers to step ST24.

At step ST23, the second encoding circuit 40 reads the amount of the allocated codes for the GOP currently encoded from the encoding control circuit 30. The second encoding circuit 40 then proceeds to step ST25.

At step ST24, the second encoding circuit 40 processes picture data with predictive coding and DCT and, after quantizing the resulting coefficient data with the quantization step size derived from the amount of allocated codes, the second encoding circuit variable length encodes the quantized data. Processing then transfers to step ST25.

Figure 10:
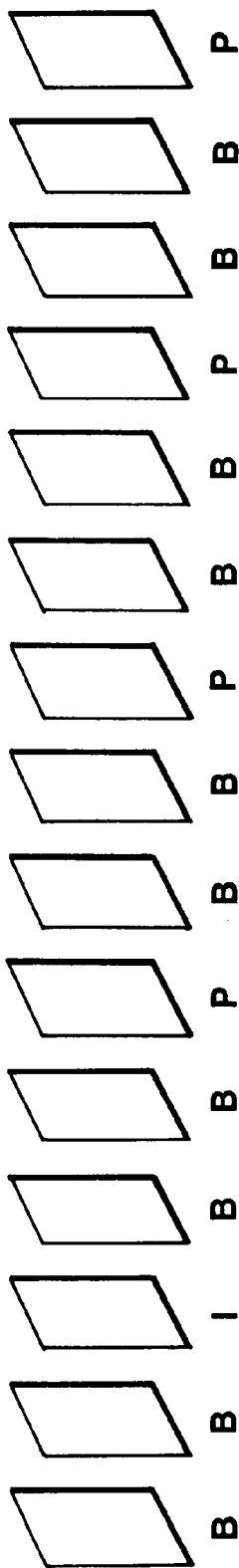
FIG. 10 illustrates plural pictures making up a GOP in MPEG.

The quantization scale setting circuit 33 sets the frame-based amount of allocated codes, from the GOP-based amount of allocated codes, supplied thereto, taking into account the picture types in actual encoding, that is picture types (I-, P- or B-pictures) shown in FIG. 10. The processing downstream of the quantization scale setting circuit 33 is similar to that of finding the frame-based amount of allocated codes, as explained previously.

It is then judged at step ST25 whether or not the encoding for the totality of frames (sequence), to which the same screen size or the same transfer rate is applied, has come to a close. If the result of judgment is affirmative, processing comes to a close and, if otherwise, processing reverts to step ST21. This realizes variable rate encoding in which the encoding rate is varied on the GOP basis, such that the quantization step size for a series of contiguous pictures (frames) of complex picture patterns or frames is not vitally changed as was the case with the conventional device and hence a uniform high picture quality may be achieved on the whole. Since the GOP-based amount of allocated codes is found in the present embodiment based upon two picture sorts, high-speed processing may be achieved as compared to the above-described embodiments. It is of course possible to find the amount of allocated codes for each GOP based upon the amount of data of all pictures in the GOP.

(4) Fourth Embodiment

Figure 13:
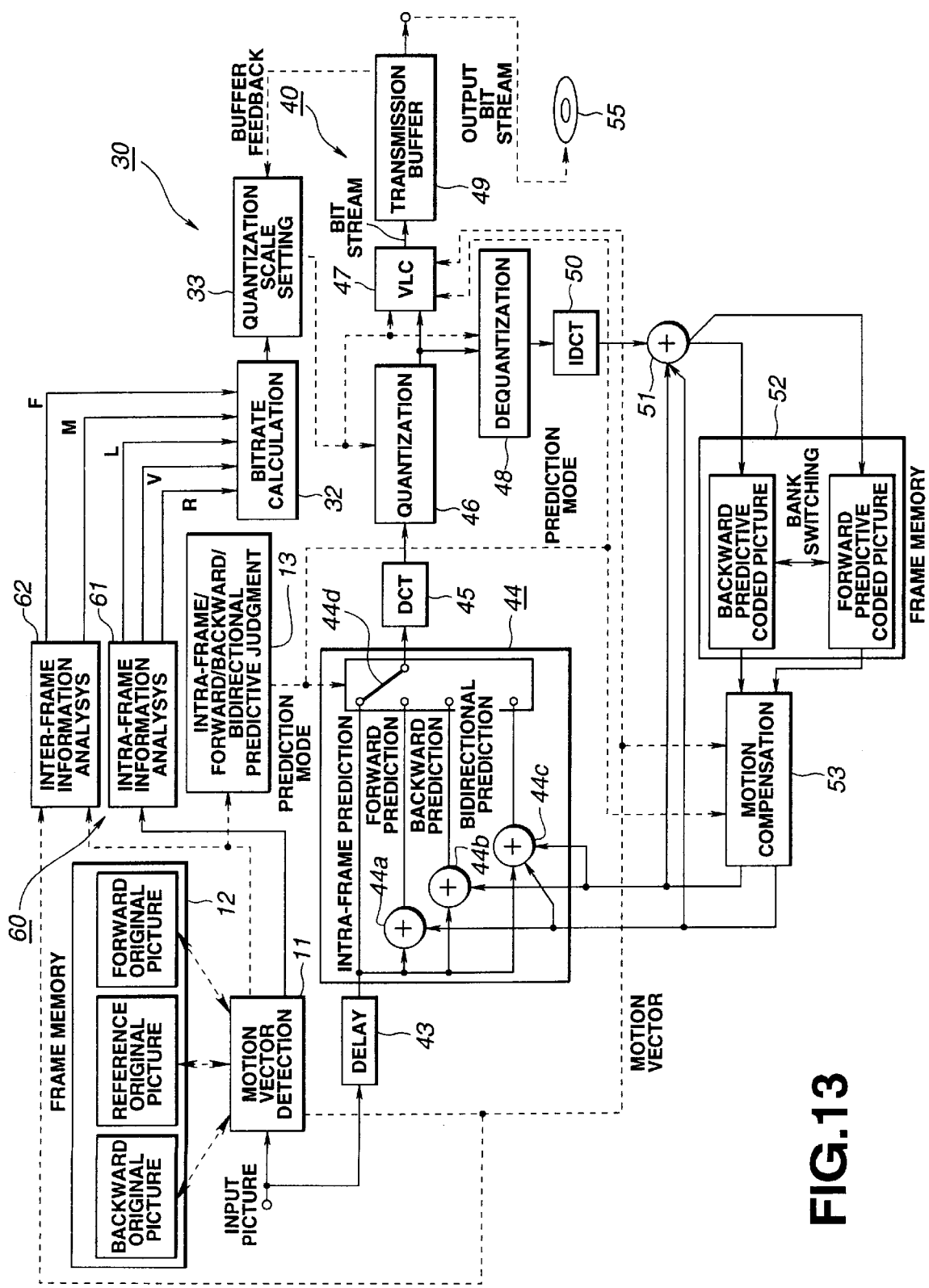
FIG. 13 is a block diagram showing a circuit structure of essential portions of a picture encoding apparatus according to a fourth embodiment of the present invention.

Referring to FIG. 13, a fourth embodiment of a picture encoding apparatus according to the present invention is explained.

The present fourth embodiment differs from the above-described first to third embodiments in the following two points. That is, the fourth embodiment is devoid of the first encoding circuit 10 of FIG. 3 and differs in the manner of finding encoding difficulty. Second, the fourth embodiment differs as to the operation of the bit rate calculating circuit 32. These points of difference are now explained.

The picture encoding apparatus of the fourth embodiment, shown in FIG. 13, has a picture analysis circuit 60 for finding statistic properties of the input video signals, and an encoding control circuit 30 for finding the encoding rate every pre-set time interval based upon statistic properties of input video signals and the total amount of usable data. The picture encoding apparatus further includes a second encoding circuit 40 encoding the input video signals every pre-set time interval based upon the encoding rate from the encoding control circuit 30 for generating second encoded data.

The picture analysis circuit 60 finds the information derived from the statistic properties of the input video signals or the information on picture characteristics. Among different sorts of the information on picture characteristics, thus calculated, there are an average value R of the chroma signals, calculated every pre-set time interval, the statistic information on chromaticity of the input picture, such as an average value R of the chroma signal Cr, calculated every pre-set time interval, the statistic information on flatness of the input picture, such as variance V of the luminance signal Y, calculated every pre-set time interval, the statistic information on the amount of movement of the input picture, such as an average value M of the amount of the motion vector, calculated every pre-set time interval, and the information on inter-picture differences, such as a sum E of absolute values of the inter-picture prediction residuals of the amount of the motion vector, calculated every pre-set time interval.

That is, as the inter-picture prediction residuals of the motion vector, the sum E of absolute values of differences of the luminance signals Ri of a macro-block referred to by the motion vector, shown by the equation (12):

$$E = \sum_{i=0}^{16*16-1} |Yi - Ri| \qquad (12)$$

is found.

As for E, a square sum may be employed in place of the sum of absolute values.

Figure 14:
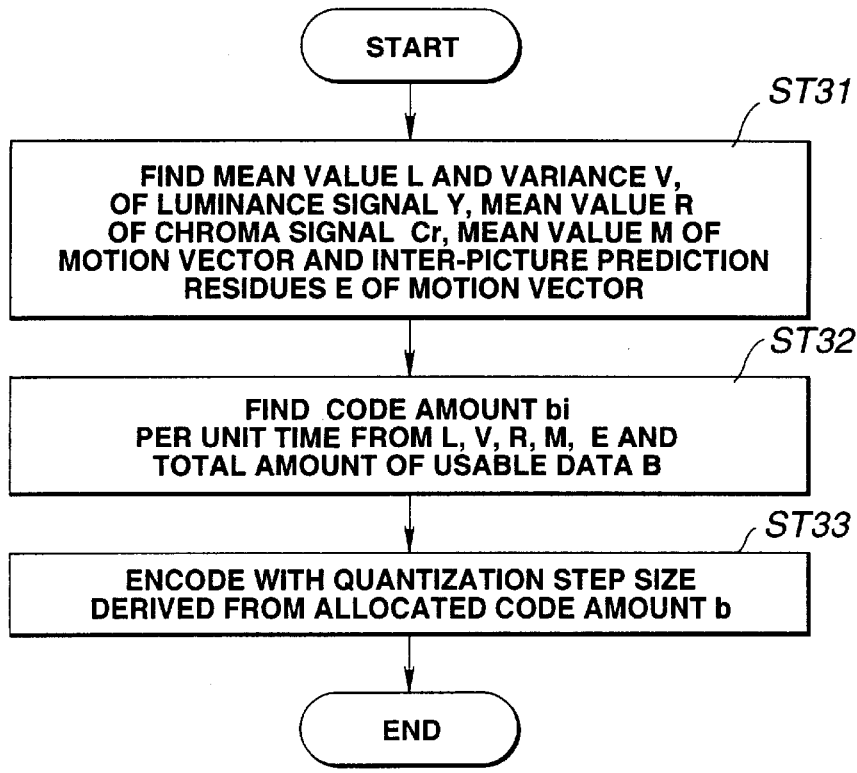
FIG. 14 is a flowchart for illustrating the operation of essential portions of a picture encoding apparatus according to the fourth embodiment of the present invention.

With the present picture encoding apparatus, the information on picture characteristics, which is the information on statistic properties of the input video signals representing the encoding difficulty, herein the average value L and the variance V of the luminance signals Y of the macro-block, the average value R of the chroma signal Cr, the average value M of the motion vector of the macro-block and the sum E of absolute values of inter-picture prediction residuals of the motion vector, are found at step ST31 every pre-set time interval, for example, every macro-block, as shown for example in FIG. 14. If the macro-block is of the intra-coding mode, that is if the macro-block is of an I-picture, it is more preferred to calculate the sum of absolute values of the residuals remaining after separation of the average values in a macro-block than calculating the sum of absolute values of inter-picture prediction residuals of the motion vector.

That is, as the sum of absolute values of residuals left after separation of the average values of a block for the intra-coding mode, the sum E of the absolute values of the differences between the luminance signal Yi of a macro-block being encoded and an average value Yav of the luminance signal Yi in the macro-block is found in accordance with the equation (13):

$$E = \sum_{i=0}^{16*16-1} |Yi - Aav| \qquad (13)$$

As for E of the equation (13), a square sum, that is the above variance V, may be employed in place of the sum of absolute values.

At the next step ST32, the bit rate calculation circuit 32 calculates the macro-block-based amount of allocated codes on the basis of the average value and the variance of the luminance signals, average value of the chroma signals, average value of the amount of the motion vector, inter-picture prediction residuals of the motion vector or the residuals left after subtracting average values from the luminance signals, and the total amount of the usable data.

At the next step ST33, the quantization circuit 46 of the encoding circuit 40 quantizes coefficient data supplied from the DCT circuit 45 with the quantization step size derived from the amount of allocated data in order to generate quantized data.

The illustrative operation of the bit rate calculating circuit 32 is now explained. That is, with the total number of macro-blocks of a sequence of N, the average value Li of the luminance signal Y of the i'th macro-block, i=0, 1, 2, . . . N-1, the variance of Vi, the average value of the chroma signal Cr of Ri and the average value of the amount of the motion vector of Mi, the bit rate calculating circuit 32 finds coefficients $\alpha j$, $\beta j$, $\gamma j$ and $\theta j$, reflecting the subjective impression in coding difficulty, from the characteristics of the functions f1, f2, f3 and f4. The bit rate calculating circuit 32 also empirically estimates an amount y'i of generated codes in a macro-block, corresponding to yi in the first embodiment, from the characteristics of the function f6, on the basis of the sum E of absolute values of the inter-picture prediction residuals of the motion vector, and finds the encoding difficulty di, from the product of the coefficients $\alpha j$, $\beta j$, $\gamma j$ and $\theta j$ with the estimated value y'i of the amount of the generated codes, as shown by the equation (31):

$$\alpha i = f1(Li) \quad (14)$$

$$\beta i = f2(Ri) \quad (15)$$

$$\gamma i = f3(Vi) \quad (16)$$

$$\theta i = f4(Mi) \quad (17)$$

$$y'i = f6(Ei) \quad (18)$$

$$di = \alpha i \times \beta i \times \gamma i \times \theta i \times y'i \quad (19)$$

Figure 15:
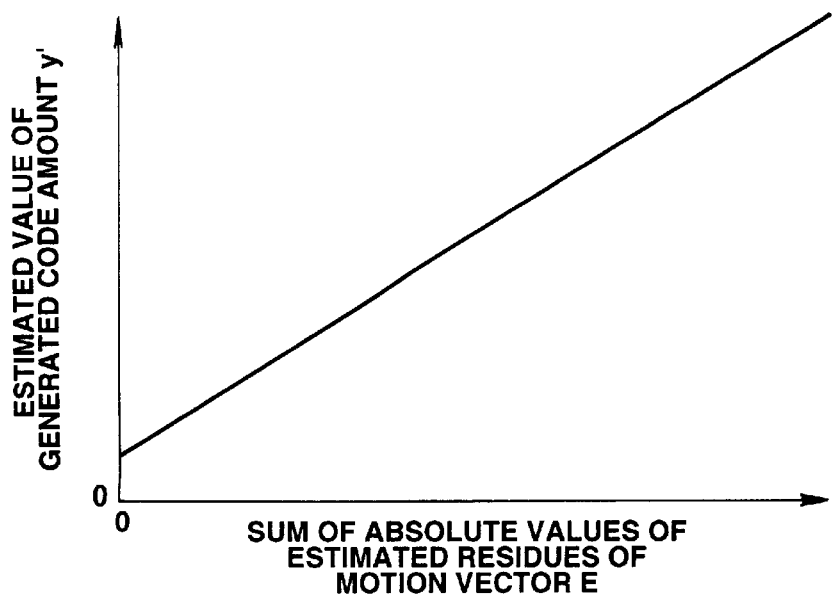
FIG. 15 is a graph showing the relation between the prediction residuals of a motion vector and a function f6 of an estimated value y'i of the macro-block based amount of generated codes.

The illustrative characteristics of the functions f1 to f4 may be those shown in FIGS. 5 to 8. FIG. 15 shows a typical example of the function f6. That is, FIG. 15 shows an estimated value y' of the macro-block based amount of generated codes against the inter-picture prediction residues of the motion vector. The results of experiments indicate that E is substantially proportional to y', such that the estimated value y'i of the amount of the generated codes for the inter-picture prediction residual Ei of the motion vector of the i'th macro-block becomes f6(Ei) is f6(Ei).

If the macro-block to be encoded is of the intra-coding mode, it is preferred to use the sum of absolute values of the residuals obtained after separation of the average values of the luminance signals in the macro-block, or the variance V, in which case the estimated value y'i of the amount of the generated codes of the macro-block is obtained from the characteristics of the function f5 based upon the variance Vi of the luminance signal Y. That is, $$y'i = f5(Vi) \quad (20)$$

Figure 16:
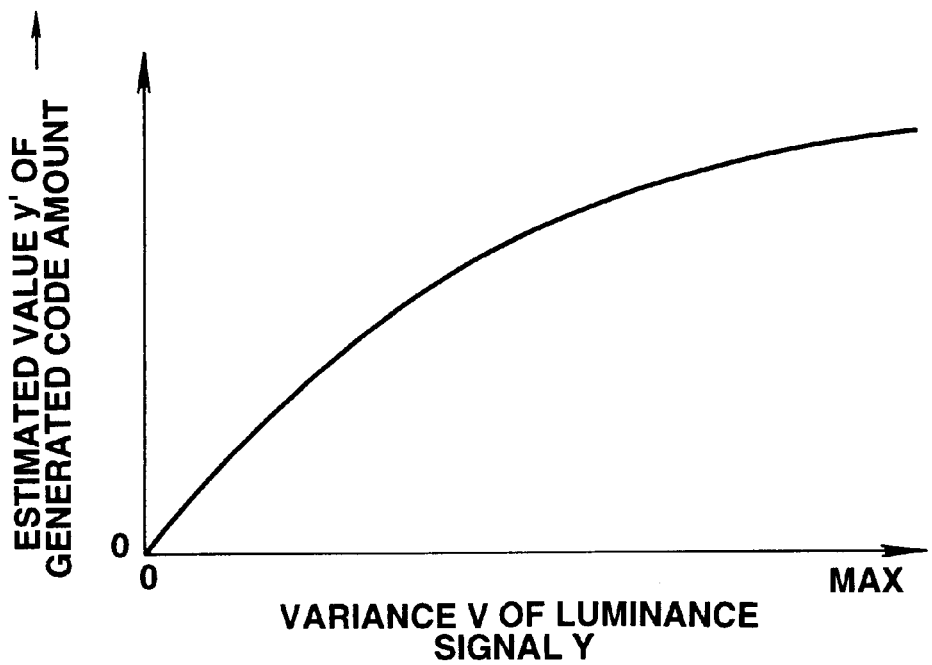
FIG. 16 is a graph showing the relation between the variance V of the luminance signal Y and a function f5 of an estimated value y'i of the macro-block based amount of generated codes.

FIG. 16 shows a typical example of the function f5(Vi).

FIG. 16 shows the estimated value y' of the macro-block-based amount of the generated codes against the variance V of the luminance signal Y. The estimated value y'1 of the amount of generated codes for the variance Vi of the luminance signal Y of the i'th macro-block is f5(Vi).

The amount of allocated codes bi for the i'th macro-block may be found by the equation (5) explained in connection with the first embodiment.

Thus the bit rate calculation circuit 32 increases the amount of the allocated codes to frames of complex picture patterns, while decreasing the amount of allocated codes to frames of simple picture patterns.

The operation of the encoding circuit 40 is omitted because it is the same as that of the second encoding circuit 40 explained in connection with the first embodiment.

In the above-described embodiments, the amount of allocated codes bi per a pre-set time interval is obtained on the macro-block basis, with the macro-block being set as the pre-set time. This pre-set time may also be a frame or a GOP (group-of-pictures). In this case, it suffices to calculate parameters such as the average value Li and the variance V of the luminance signal Y, average value Ri of the chroma signal Cr and the average value Mi of the amount of the motion vector, every pre-set time interval, to calculate the sum Ei of absolute values of the residuals of the luminance signals less the average values or the inter-picture prediction residuals of the motion vector, every pre-set time interval, to calculate the encoding difficulty every pre-set time interval, as in the equation (19), and to calculate the amount of allocated codes every pre-set time interval, as in the second and third embodiments.

(5) Fifth Embodiment

Figure 17:
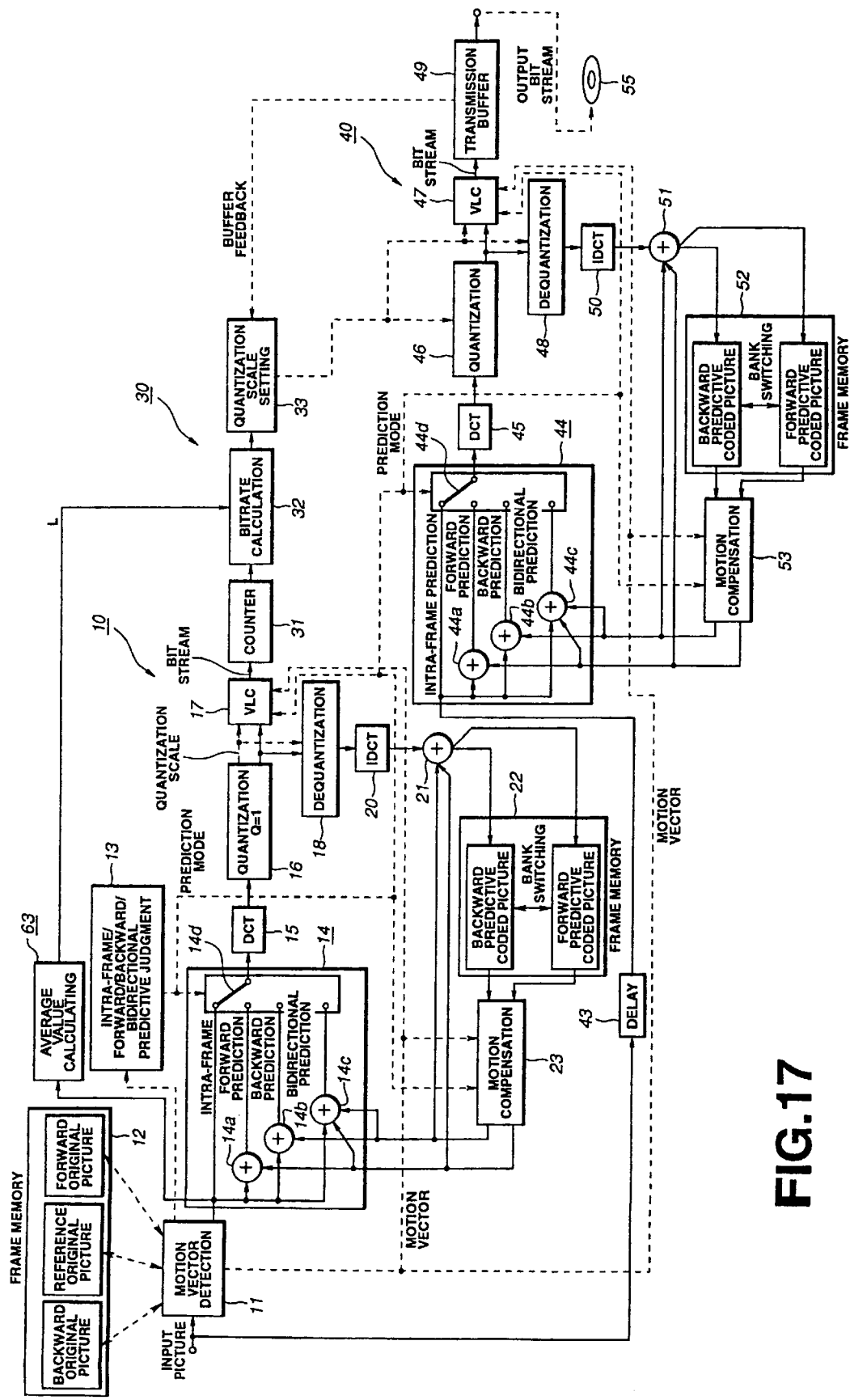
FIG. 17 is a block diagram showing the circuit structure of a picture encoding apparatus according to an embodiment of the present invention.

Referring to FIG. 17, a fifth embodiment of the picture encoding apparatus according to the present invention will be explained in detail.

Figure 2:
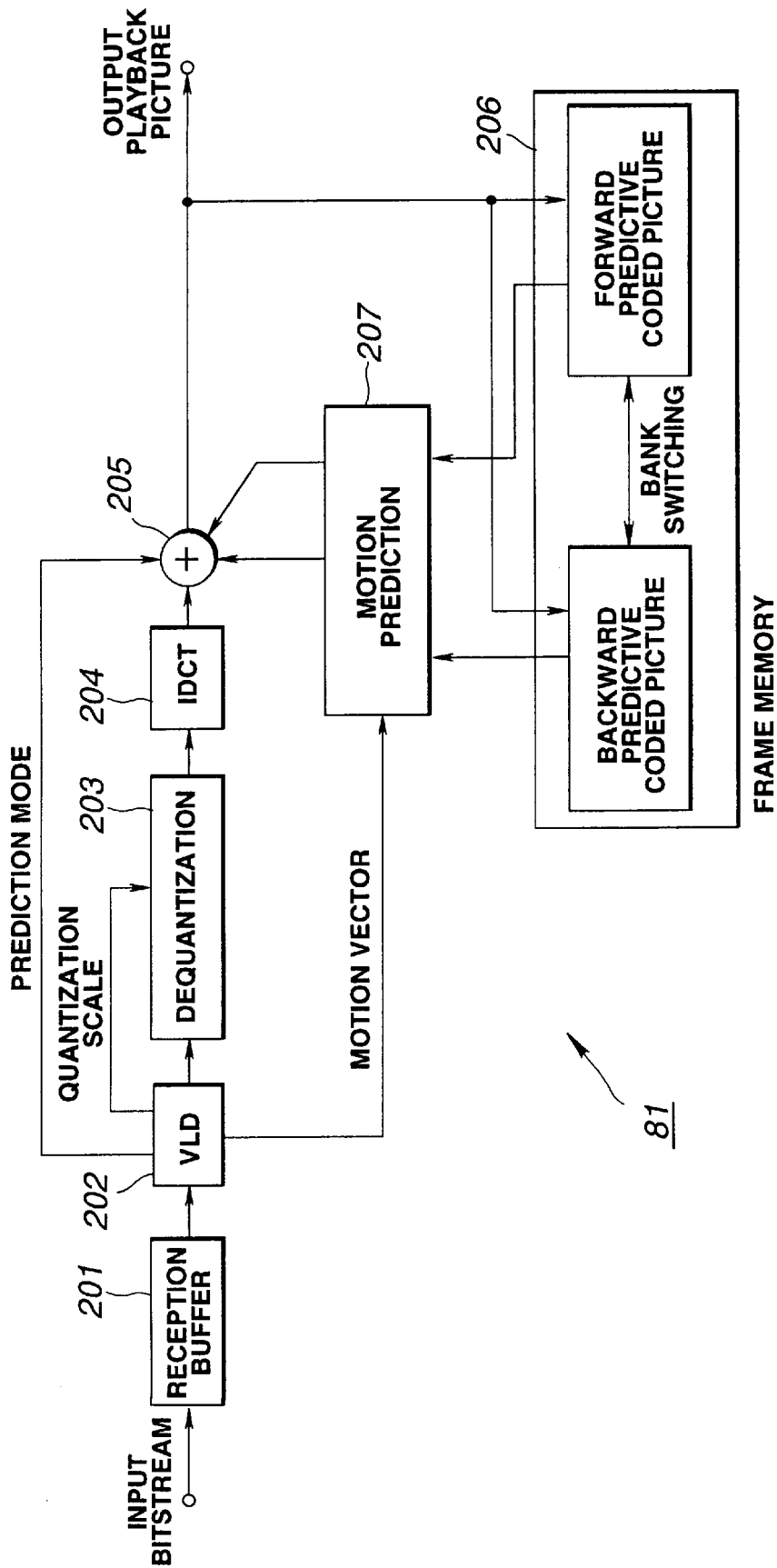
FIG. 2 is a block diagram showing an example of a conventional decoder circuit configuration.

The present fifth embodiment differs from the first embodiment shown in FIG. 3 as to provision of an average value calculating circuit 63 in place of the picture analysis circuit 60 and as to the operation of the bit rate calculation circuit 32. The operation of the present fifth embodiment is otherwise the same as that shown in FIG. 2 and hence is not explained in detail.

Figure 18A:
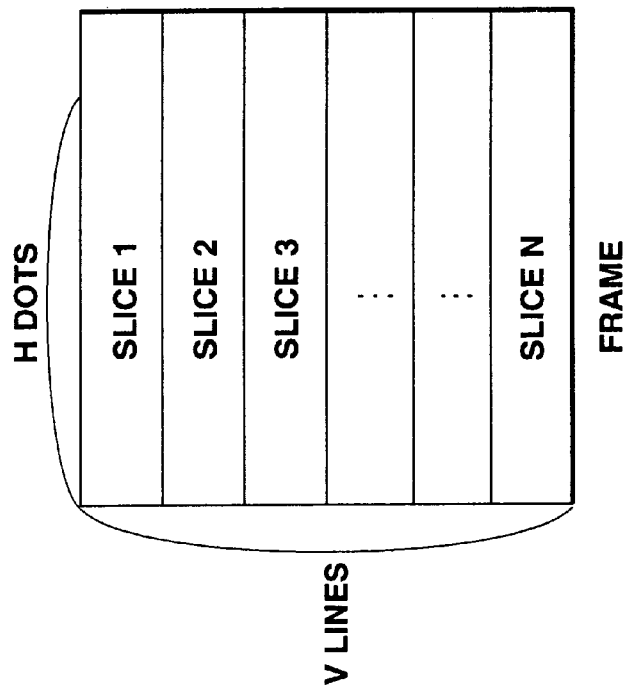
FIGS. 18A, 18B and 18C illustrate the structure of a frame, the structure of a slice and the constitution of a macro-block.
Figure 18C:
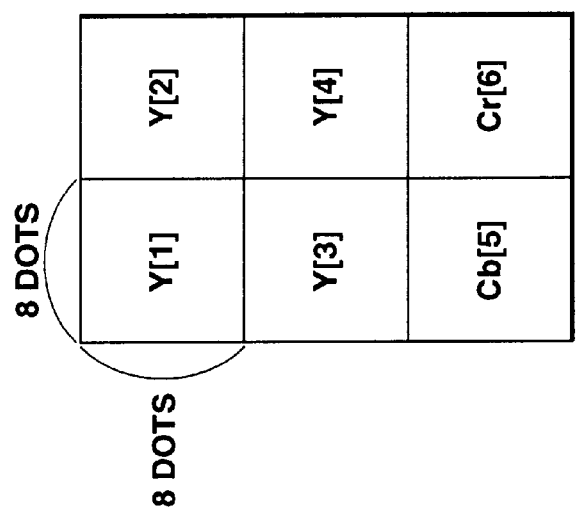
Figure 18B:
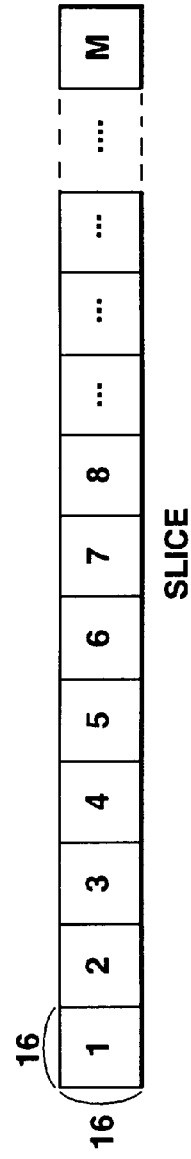

The average value calculation circuit 63 for the luminance signals calculates the average value L of the luminance signal of the input macro-block every pre-set time interval. Each macro-block is made up of luminance data Y1, Y2, Y3 and Y4 of four luminance blocks each made up of 8×8 pixels and neighboring to one another vertically and horizontally, and chroma data Cb, Cr of two chroma blocks, each made up of 8×8 pixels, for a range of the four luminance blocks, as shown in FIG. 18C. The calculation circuit 63 calculates the average value of 256 pixels making up the luminance blocks Y1 to Y4 (8×8 pixels×four blocks), from one macro-block to another, and calculates an average value L every pre-set time interval, for example, for each picture. The average value L of the luminance signals is an index representing lightness of the picture. If the luminance value of the pixel is represented by eight bits, the average value L ranges from 0 to 255.

With the present picture encoding apparatus, the first encoding circuit 10 processes a sequence of the input picture data with encoding, such as predictive coding, DCT, quantization with a pre-set quantization step, and VLC to produce a variable length encoded data as a first bitstream. The encoding control circuit 30 finds the data amount of the variable length coded data every pre-set time interval. The average value calculating circuit 63 of the luminance signals calculates the average value L of the luminance signal Y of the input picture signal every pre-set time interval. The encoding bit rate is found every pre-set time interval based upon the data capacity of the picture recording medium 55, such as an optical disc, a magnetic disc or a magnetic tape, or the total amount of usable data as determined by the bit rate (transfer rate) of the transmission channel. The second encoding circuit 40 then processes the input picture data with predictive coding, DCT, quantization and VLC for generating variable length encoded data as a second bitstream. At this time, the input picture data is quantized with the quantization step size derived from the encoded bit rate.

Figure 19:
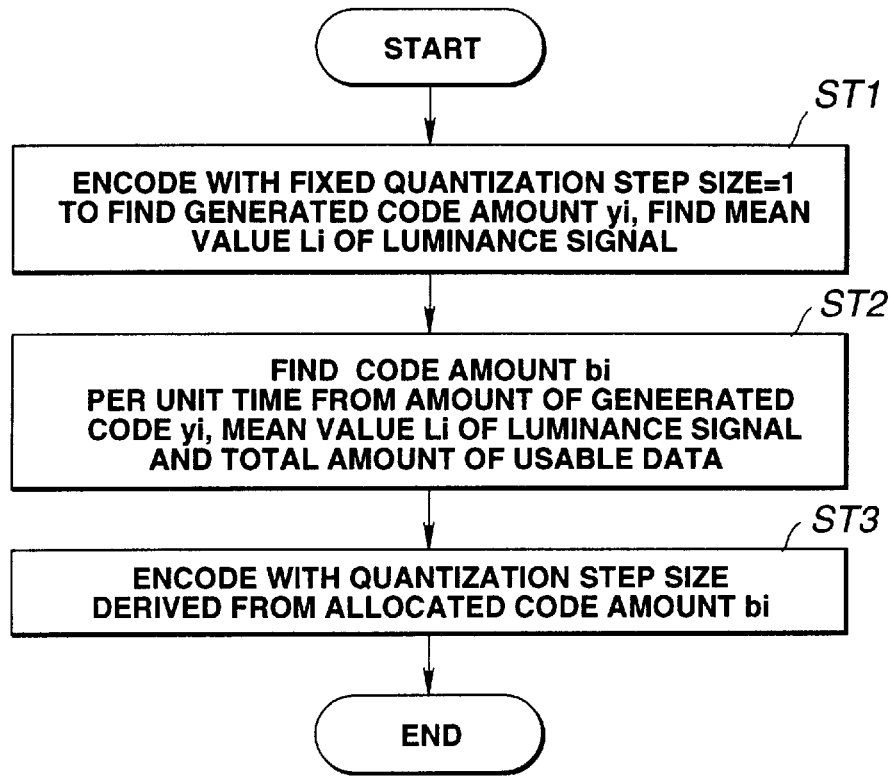
FIG. 19 is a flowchart showing the operation of a first encoding circuit constituting the picture encoding apparatus of FIG. 17.

Referring to the flowchart of FIG. 19, a typical operation of the first encoding circuit 10 making up the picture encoding apparatus of the present embodiment is explained in detail.

At step ST41 of the flowchart of FIG. 19, the quantization circuit 16 of the first encoding circuit 10 quantizes the coefficient data supplied from the DCT circuit 15, using a fixed value of the quantization step size, to generate quantized data. The counter 31 of the encoding control circuit 30 counts the quantity of the variable length encoded data as a first bitstream, obtained on variable length encoding the quantized data, for a pre-set time, for example, for each picture, to find the amount of the generated codes on the picture basis.

At the next step ST42, the bit rate calculation circuit 32 finds the amount of generated data for each picture based upon the picture-based amount of generated codes, average value L of the picture-based luminance signals and the total amount of the usable data B.

At step ST43, the quantization circuit 46 of the second encoding circuit 40 quantizes the coefficient data supplied from the DCT circuit 45 with the quantization step width derived from the amount of the allocated codes to generate quantized data.

The bit rate calculation circuit 32 finds the amount of the allocated codes for the picture, that is the picture-time-based mean encoding rate, based upon the picture-based amount of the generated codes, average value L of the luminance signal Y of the picture and the total amount of the usable data, and transmits the amount of the allocated codes to the quantization scale setting circuit 33 of the second encoding circuit 40.

Specifically, with the total number of pictures of the input picture sequence of N, the bit rate calculation circuit 32, the total amount of the usable data of B, the amount of generated codes of the i'th picture of yi, i=0, 1, 2, . . . . N-1, with the quantization step size being fixed, and with the average value of the luminance signal of the i'th picture of Li, the bit rate calculation circuit 32 finds the coefficient $\alpha$ from the characteristics of the function f1, as shown in the following equation 21:

$$\alpha = f1(Li, yi) \quad (21)$$

and finds the encoding difficulty di based upon the product of the coefficient A with yim as shown by the equation (22):

$$di = \alpha \times yi \quad (22)$$

The coefficient $\alpha$ reflects the subjective impression of the encoded picture in the encoding difficulty di. It has been found by experiments that apparent deterioration in the picture quality caused by picture encoding is related with picture lightness, such that, with a dark picture, the encoding noise, such as block noise or mosquito noise, may be perceived more easily.

Figure 20:
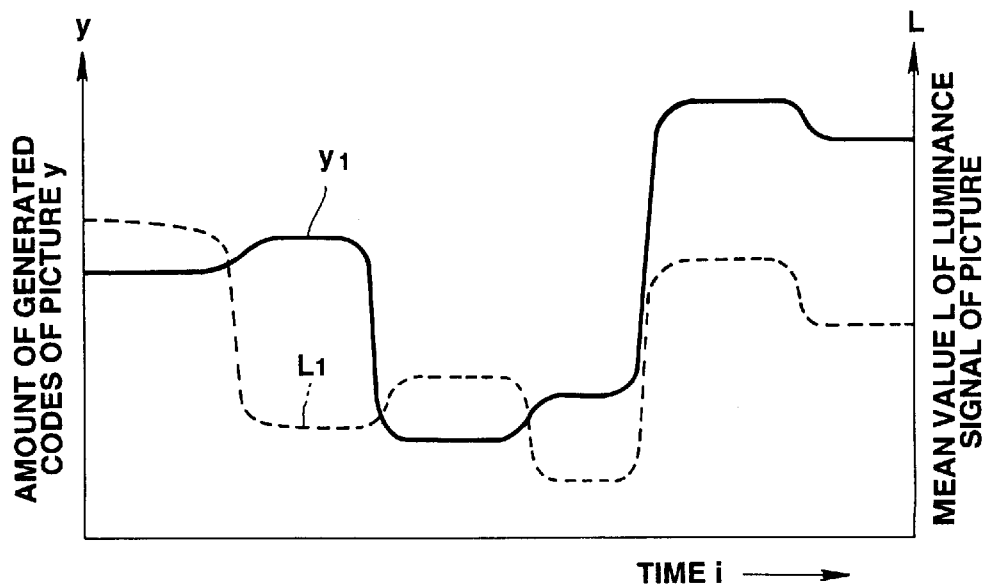
FIG. 20 is a graph showing time changes of the amount of the generated codes y of a picture with the quantization step size being fixed and the mean value L of luminance signals of a picture.

FIG. 20 shows an example of time changes of yi and Li in the moving picture sequence. It is seen from FIG. 20 that the same value of the generated codes yi does not necessarily give the same picture lightness Li because the amount of the generated codes yi is related with complexity of the picture pattern and predominantly reflects the energy intensity of ac coefficients of the DCT coefficients. The lightness Li of the picture reflects dc coefficient of the DCT coefficient, the code amount of which is extremely small as compared to the code amount of the ac coefficients. Thus the lightness of the picture, which is relevant to the subjective impression of the picture, is not sufficiently reflected in the amount yi. Thus, not only the amount yi but also the lightness Li is employed for calculating the encoding difficulty di for taking into account the subjective impression of the picture more intensively.

Figure 21:
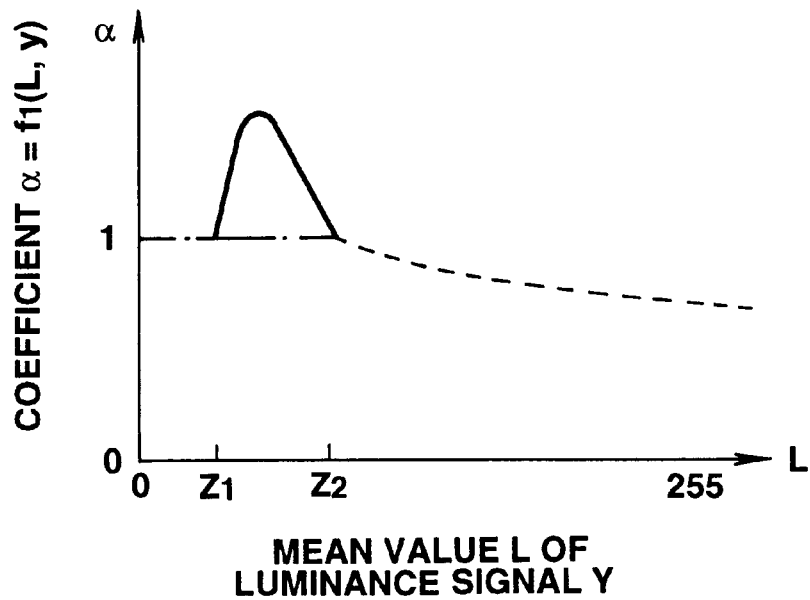
FIG. 21 is a graph showing the relation between the mean value L of luminance signals of a picture and a coefficient α used for deriving the quantization step size.

Referring to FIG. 21, the function f1 is a function having the amount of generated codes yi and the average value of the luminance signal of the picture Li as arguments, with the quantization step size being fixed.

Figure 22:
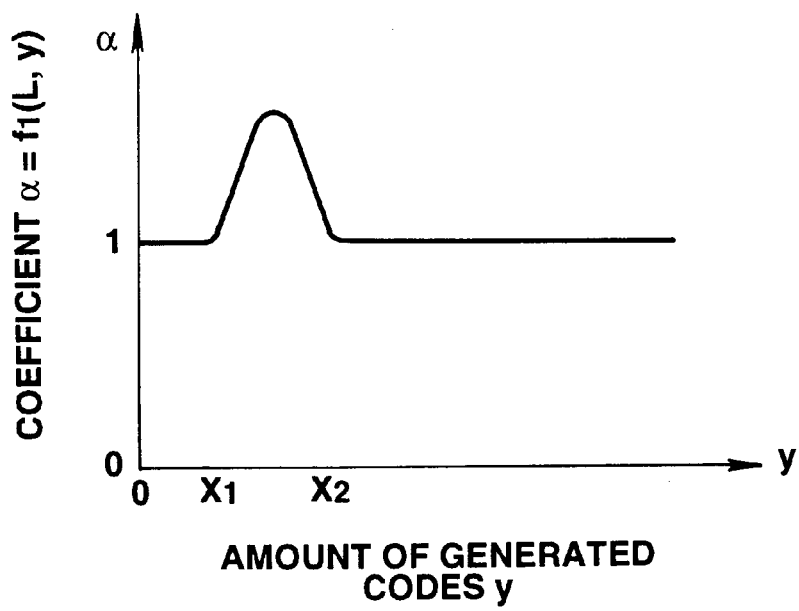
FIG. 22 is a graph showing the relation between the amount y of generated codes of a picture and a coefficient α for deriving the encoding difficulty.

FIGS. 21 and 22 show typical characteristics of the function f1. In FIGS. 1 and 22, the ordinate denote the coefficients a. In FIGS. 21 and 22, the abscissa denotes the average value L of the luminance signals Y and the amount of the generated codes y, respectively. These characteristics are obtained by the following results which have been confirmed experimentally.

In general, the eye of the human being perceives the encoding noise in a dark picture more readily. However, if the darkness exceeds a pre-set level, the encoding noise becomes imperceptible due to excessive darkness. The encoding noise becomes less perceptible with a lighter picture. That is, if the average value of the luminance signals in a picture is in a certain level range, the encoding noise is most perceptible.

It has also been found that, if a picture is dark and exhibits picture patterns of lower complexity, with the average value L of the luminance signal of the picture being in the above level range, the encoding noise becomes most perceptible. The picture pattern complexity is related with the amount of the generated codes y, with the quantization step size being fixed, as explained previously. Specifically, the range of y for which the encoding noise is perceptible most acutely is smaller than the average value of y in the picture sequence.

Figure 23:
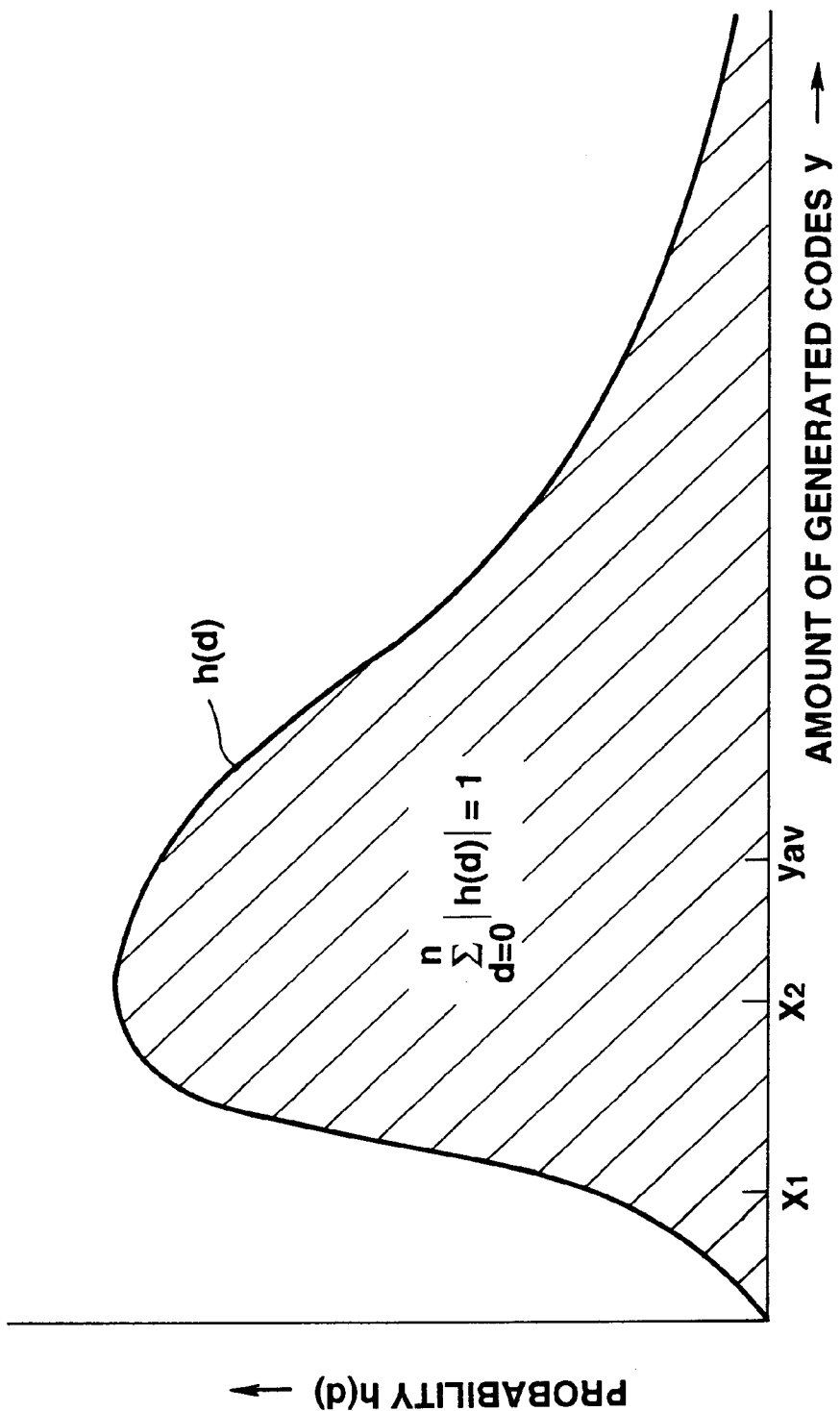
FIG. 23 is a graph showing a typical distribution of the amount of generated codes y in a sequence of moving pictures with the quantization step size remaining fixed.

FIG. 23 shows an example of the distribution of the amount of the generated codes in the moving picture sequence such as that of a motion picture. In FIG. 23, yav means the average value of y in the moving picture sequence. The range of y for which the encoding noise is most perceptible is substantially from X1 to X2.

The characteristics of the function f1 shown in FIGS. 21 and 22 are now explained. The axis for lightness L denotes black and the lightest value at L=0 and at L=255, respectively, with L=128 being a grey level.

(1) If a picture is a dark one with the amount of generated codes y being lower and in a range $X1 \leq y \leq X2$ (see FIG. 23) and with a lower picture pattern complexity, with $Z1 \leq L \leq Z2$, $\alpha=1$ and has a peak in a range defined by $X1 \leq y \leq X2$ and $Z1 \leq L \leq Z2$. This corresponds to a solid line in FIG. 21.

(2) If a picture is a lighter one with L2>Z2 without regard to y, $\alpha<1$ and $\alpha$ becomes the smaller the larger the value of L. This corresponds to a broken line in FIG. 21.

(3) Excepting the cases of (1) and (2) above, $\alpha=1$. This holds for the following three cases. The first case is one in which L<Z1 without regard to y. This corresponds to a substantially black picture. The second case is one in which L<Z2 and y<X1. This corresponds to a dark picture having a relatively flat pattern. The third case is one in which the picture is dark and has a relatively complex pattern. This corresponds to a chain-dotted line in FIG. 21.

For clarifying characteristic points in FIGS. 21 and 22, FIGS. 21 and 22 show a coefficient $\alpha$ for the average value L of the luminance signal for the amount of the generated codes y being substantially $(X1-X2)/2$ and a coefficient $\alpha$ for the average value L of the luminance signal for the average value of the generated codes L being substantially $(Z1-Z2)/2$, respectively.

The coefficient $\alpha$, thus found, is multiplied with the amount of the generated codes yi, as shown in the equation (22), to give the encoding difficulty di. If $\alpha>1$ and $\alpha<1$, the encoding difficulty di is increased and decreased, respectively, as may be seen from the equation (2).

In calculating the average value Li of the luminance signal of a picture, it may be calculated as a mean value for the totality of the macro-blocks of a picture, or as a mean value for designated macro-blocks of the picture. The latter method is effective in handling a picture of a letterbox format, that is a format in which upper and lower frame portions are masked with black zones for displaying a cinema-size picture on a 4:3 monitor. In this case, the average value Li is calculated for the macro-blocks making up a mid effective picture portion excepting the upper and lower frame portions of the picture. This method is effective since the properties of the mid effective portion of the frame can be captured accurately.

If the amount of allocated codes for the i'th picture is set as bi and this amount of the allocated codes bi is proportionate to the encoding difficulty di as shown by the equation (23):

$$bi = a \times di + C \qquad (23)$$

the total amount of data B is found by summing the amounts of allocated bits bi of all of the pictures, as indicated in the equation (24):

$$B = \sum_{i=0}^{N-1} bi = \sum_{i=0}^{N-1}(a \times di + C) = a \times \sum_{i=0}^{N-1} di + N \times C \qquad (24)$$

where a and c are constants.

The constant c is a value pre-determined responsive to the average bit rate in each sequence. The constant may be found by the following equation (25):

$$a = (B - N \times C) + \sum_{i=0}^{N-1} di \qquad (25)$$

By substituting this constant a into the equation (23), the amount of the allocated codes bi for the i'th frame may be found from the following equation (26):

$$bi = di \times \left((B - N \times C) + \sum_{i=0}^{N-1} di\right) + C \qquad (26)$$

Thus the bit rate calculating circuit 32 increases the amount of allocated codes for a picture for which the encoding noise is readily perceptible or a picture having a relatively complex pattern, while decreasing the amount of allocated codes for a picture for which the encoding noise is less perceptible or a picture having a relatively simple pattern. An optimum code amount allocation for each picture and for the recording medium may be achieved by actually encoding pictures in the second encoding circuit 40 in conformity to the amount of the allocated codes.

The quantization scale setting circuit 33 finds, from the frame-based amount of the allocated codes, supplied thereto, a macro-block based amount of allocated codes, such as the frame-based amount of the allocated codes divided by the number of macro-blocks in a frame, and compares the amount of codes generated in a macro-block and detected from the buffer macro-block from the transmission buffer 49 to the macro-block based amount of the allocated codes.

If the amount of the codes allocated to a macro-block under consideration is larger than the macro-block based amount of the allocated codes, the quantization step size of the next macro-block is set to a larger value for suppressing the amount of generated codes in the next macro-block. Conversely, if the amount of the codes allocated to the macro-block under consideration is less than the macro-block based amount of the allocated codes, the quantization step size of the next macro-block is set to a smaller value for increasing the amount of generated codes in the next macro-block. This allows to approach the frame-based encoding bit rate to the mean encoding bit rate for each pre-set frame time as a unit. In addition, it is possible for the quantization scale setting circuit 33 to increase the quantization step size to suppress the overflow, without regard to the results of comparison of the amount of the allocated codes to the amount of the generated codes, if the buffer feedback from the transmission buffer 49 indicates the impending overflow of the transmission buffer 48. Similarly, it is possible for the quantization scale setting circuit 33 to decrease the quantization step size to suppress the underflow, without regard to the results of comparison of the amount of the allocated codes to the amount of the generated codes, if the buffer feedback from the transmission buffer 49 indicates the impending underflow of the transmission buffer 48.

Although the amount of the generated codes and the amount of the allocated codes are compared in the above description on the macro-block basis for switching the quantization step size on the macro-block basis, it is possible to effectuate such switching on the slice basis, on the frame basis or on the GOP basis.

Although the amount of generated codes is detected in the above description from the stored amount in the transmission buffer 49, it may also be produced from an output of the VLC circuit 47. The quantization scale circuit 33 transmits the quantization step size, thus set, to the quantization circuit 46.

With the above-described embodiments of the present invention, the first encoding circuit 10 pre-sets the standard quantized values for calculating the encoding difficulty every pre-set time interval, and finds the code amount only by fixed quantization by pre-setting standard quantized values without performing control based upon the stored quantity in the buffer. The average value of the luminance signal is calculated every pre-set time interval in addition to the amount of the coded information for the fixed standard quantized values. The bit rate calculation circuit finds the amount of codes allocated every pre-set time interval, for example, the frame-time-based mean encoding rate, based upon the average value of the luminance signal, amount of the encoded information and the total amount of the usable data.

The second encoding circuit 40 sets a target code amount for the amount of the generated codes, derived from the provisional encoding (first encoding) every pre-set time interval, and controls the quantization step size or the quantized values for encoding the picture. That is, the quantization step size is diminished in a portion of a dark picture where the noise is liable to be perceived so that the code amount will be allocated responsive to the visual sense of the human being every pre-set time interval.

By such encoding for reflecting the visual sense of the human being, it becomes possible to prevent the encoding noise (blocking noise or mosquito noise) from becoming pronounced even in picture portions which possibly gives poor subjective impression as to the encoded picture quality depending upon picture patterns, such as dark picture portions.

With the above-described embodiments of the present invention, the input video signals are processed with encoding, such as predictive coding, DCT, quantization with a pre-set quantization step size or VLC for generating first encoding data. The frame- or GOP-based amount of allocated codes are found on the basis of the frame-based or GOP-based amount of allocated codes of the first encoded data and the total amount of the usable data. The input video signals are encoded every pre-set time interval based upon this amount of the allocated codes for generating second encoded data. This achieves variable rate encoding in which the encoding rate is varied every pre-set time interval, such that, even if pictures or frames of complex picture patterns occur contiguously, the quantization step size need not be increased for these pictures as was the case with the conventional apparatus, thus assuring a uniform high picture quality on the whole.

In addition, since the second encoded data, produced as described above, are of a variable bit rate, the limited recording capacity may be effectively utilized by recording these second encoded data on the picture recording medium, thus allowing to elongate the recording time on the picture recording medium. It is possible to reproduce picture data of high uniform picture quality from this recording medium.

The present invention is not limited to the above-described embodiments. For example, the transform coding may be so-called strato-transform or wavelet transform in place of DCT employed in the above embodiments.

It will be seen from above that, according to the present invention, encoding may be achieved on the basis of the data amount in terms of a pre-set time interval responsive to the picture complexity, at an encoding rate reflecting the visual sense of the human being, based upon the information on picture characteristics, so that the total amount of usable data will be utilized effectively.

If pictures or frames with complex picture patterns occur contiguously, the quantization step size is not increased for these pictures or frames as was the case with the conventional apparatus, thus assuring visually desirable high uniform picture quality.

In addition, since the second encoding data, thus produced, are of a variable rate, the limited recording capacity of the picture recording medium may be utilized effectively by recording these second encoding data on the picture recording medium. It is possible to reproduce picture data of high picture quality which is satisfactory visually and uniform on the whole.

If the encoding rate in terms of a pre-set time interval as a unit is calculated on the basis of the total amount of the usable data, and the information on encoding difficulty, calculated every pre-set time interval from the information on picture characteristics of the input video signals for each pre-set time interval, without generating the first encoded data, and the input video signals are encoded every pre-set time period based upon the encoding rate, it becomes possible to achieve the result substantially similar to that described above and to simplify the system.

What is claimed is:

1. A method for encoding picture data from input video signals comprising the steps of:

generating picture characteristics information including an average value of luminance signals and at least one of chromaticity of the picture, flatness of the picture and movement of the picture;

estimating an initial bit rate for an encoded picture over a predetermined time interval;

calculating an encoding difficulty from said picture characteristics information and the estimated initial bit rate such that said encoding difficulty is representative of the encoding noise, red color distortion, and picture deterioration from fast image movements which results from encoding;

determining an adjusted encoding bit rate on the basis of said encoding difficulty and constrained by a predetermined total amount of encoded data; and encoding said picture data in accordance with said adjusted encoding bit rate.

2. The method for encoding picture data as claimed in claim 1, wherein said information on chromaticity is a mean value of chroma signals, said information on flatness is a variance value of the luminance signals, and said information on the picture movement is a mean value of a motion vector of a macro-block.

3. The method for encoding picture data as claimed in claim 1, wherein the estimated initial bit rate is determined from the amount of encoded data obtained from quantizing with a fixed quantization step size, thereby variable length encoding the input video signals.

4. The method for encoding picture data as claimed in claim 1, wherein said step of encoding includes:

calculating a block-based encoding bit rate from said adjusted encoding bit rate;

comparing the block-based encoding bit rate to a bits generation rate determined on a block basis;

controlling a quantization step size for the next block to be encoded responsive to the result of the comparing step; and encoding said picture data using said quantization step size.

5. An apparatus for encoding picture data picture data from input video signals, comprising:

means for generating picture characteristics information including an average value of luminance signals and at least one of chromaticity of the picture, flatness of the picture and movement of the picture;

means for estimating an initial bit rate for an encoded picture over a predetermined time interval;

means for calculating an encoding difficulty from said picture characteristics information and the estimated initial bit rate such that said encoding difficulty is representative of the encoding noise, red color distortion, and picture deterioration from fast image movements which results from encoding;

means for determining an adjusted encoding bit rate on the basis of said encoding difficulty and constrained by a predetermined total amount of encoded data; and means for encoding said picture data in accordance with said adjusted encoding bit rate.

6. The apparatus for encoding picture data as claimed in claim 5, wherein said information on chromaticity is a mean value of chroma signals, said information on flatness is a variance value of the luminance signals, and said information on the picture movement is a mean value of a motion vector of a macro-block.

7. The apparatus for encoding picture data as claimed in claim 5, wherein the estimated initial bit rate is determined from the amount of encoded data obtained from quantizing with a fixed quantization step size, thereby variable length encoding the input video signals.

8. The apparatus for encoding picture data as claimed in claim 5, wherein said means for encoding comprises:

means for calculating a block-based encoding bit rate from said adjusted encoding bit rate;

comparing means for comparing the block-based encoding bit rate to a bits generation rate determined on a block basis;

means for controlling a quantization step size for the next block to be encoded responsive to the result of the comparing means; and means for encoding said picture data using said quantization step size.

* * * * *